(12) United States Patent
Kamani et al.

(10) Patent No.: US 7,849,065 B2
(45) Date of Patent: Dec. 7, 2010

(54) HETEROGENEOUS CONTENT INDEXING AND SEARCHING

(75) Inventors: Prashant Kamani, Issaquah, WA (US); Daniel D. Fisher, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 500 days.

(21) Appl. No.: 11/880,331

(22) Filed: Jul. 20, 2007

(65) Prior Publication Data

US 2009/0024650 A1 Jan. 22, 2009

(51) Int. Cl.
*G06F 7/00* (2006.01)

(52) U.S. Cl. ................................ 707/705; 707/707

(58) Field of Classification Search ............ 707/1–10, 707/705–714, 781–789, 809–812
See application file for complete search history.

(56) References Cited

U.S. PATENT DOCUMENTS

| | | | |
|---|---|---|---|
| 5,493,677 A | 2/1996 | Balogh et al. | 707/104.1 |
| 6,055,543 A | 4/2000 | Christensen et al. | 707/104.1 |
| 6,327,589 B1 | 12/2001 | Blewett et al. | 707/5 |
| 6,374,260 B1 | 4/2002 | Hoffert et al. | 707/104.1 |
| 6,785,688 B2 | 8/2004 | Abajian et al. | 707/102 |
| 6,925,475 B2 | 8/2005 | Essafi et al. | 707/104.1 |
| 6,959,326 B1 | 10/2005 | Day et al. | 709/217 |
| 7,010,144 B1 | 3/2006 | Davis et al. | 382/100 |
| 7,010,751 B2 | 3/2006 | Shneiderman | 715/232 |
| 7,028,253 B1 | 4/2006 | Lieberman et al. | 715/232 |
| 7,051,019 B1 | 5/2006 | Land et al. | 707/4 |
| 7,613,993 B1 * | 11/2009 | Baer et al. | 715/205 |
| 2004/0161150 A1 | 8/2004 | Cukierman et al. | 382/186 |
| 2005/0289111 A1 | 12/2005 | Tribble et al. | 707/1 |
| 2006/0061595 A1 | 3/2006 | Goede et al. | 345/619 |
| 2006/0130117 A1 | 6/2006 | Lee et al. | 725/135 |
| 2006/0149781 A1 | 7/2006 | Blankinship | 707/103 R |
| 2006/0200446 A1 | 9/2006 | Gursky et al. | 707/2 |
| 2006/0242118 A1 | 10/2006 | Engel | 707/3 |
| 2006/0242166 A1 | 10/2006 | Larcheveque et al. | 707/100 |
| 2006/0259516 A1 | 11/2006 | Stakutis et al. | 707/200 |
| 2007/0016546 A1 | 1/2007 | De Vorchik et al. | 707/1 |
| 2007/0038665 A1 | 2/2007 | Kwak et al. | 707/102 |
| 2007/0266007 A1 | 11/2007 | Arrouye et al. | 707/3 |
| 2008/0018503 A1 | 1/2008 | Kim et al. | 341/50 |
| 2008/0059495 A1 * | 3/2008 | Kiessig et al. | 707/100 |

(Continued)

OTHER PUBLICATIONS

Day, et al., "Metadata Image Retrieval: Combining Content-Based and Metadata-Based Approaches," Second UK Conference on Image Retrieval, Newcastle, Feb. 26, 1999, pp. 1-5; http://www.ariadne.ac.uk/issue19/metadata/.

(Continued)

*Primary Examiner*—Wilson Lee
(74) *Attorney, Agent, or Firm*—Merchant & Gould

(57) ABSTRACT

Embodiments are provided to manage information associated with a number of disparate information sources. Metadata and/or other information can be extracted from a file, data stream, or other information source. The extracted metadata and/or other information can be used when performing indexing and searching operations. In one embodiment, a system includes a data structure having a uniform metadata representation and metadata handler for interacting with the data structure. The data structure can be associated with an underlying file or some other information source. The embodiments provide extensibility and can be tailored according to a desired implementation.

12 Claims, 5 Drawing Sheets

U.S. PATENT DOCUMENTS

2009/0024587 A1    1/2009    Kamani et al. ................ 707/3

OTHER PUBLICATIONS

Wikipedia (Free Encyclopedia)—"Content-Based Image Retrieval," Oct. 27, 2007, pp. 1-6; http://en.wikipedia.org/wiki/Content-based_image_retrieval.

Yee, et al., "Faceted Metadata for Image Search and Browsing," Apr. 5-10, 2003, CHI 2003, pp. 1-8; http://flamenco.berkeley.edu/papers/flamenco-chi03.pdf.

Addis, et al., Cultivate Interactive—"Artiste Image Retrieval System Puts European Galleries in the Picture," Jun. 2002, pp. 1-21; http://www.cultivate-int.org/issue7/artiste/.

"MindManajer IFilter; Product Description", printed on Nov. 19, 2007, pp. 1-2; http://www.ifiltershop.com/mindmanager-ifilter.html.

Kawtrakul, et al., "A Unified Framework for Automatic Metadata Extraction from Electronic Document", pp. 1-8; http://iadlc.nul.nagoya-u.ac.jp/archives/IADLC2005/kawrtrakul.pdf.

Dumais, et al., "Stuff I've Seen: A System for Personal Information Retrieval and Re-Use", pp. 1-8, Jul. 28-Aug. 1, 2003, SIGIR '03; http://research.microsoft.com/~sdumais/SISCore-SIGIR2003-Final.pdf.

Notice of Allowance mailed Jan. 7, 2010 in connection with U.S. Appl. No. 11/880,281.

Lv et al., "Ferret: a toolkit for content-based similarity search of feature-rich data", Proceedings of the 1st ACM SIGOPS/EuroSys European Conference on Computer Systems, p. 317-330, Apr. 18, 2006. Retrieved from the Internet:<URL: http://portal.acrn.org/ft_gateway.cfm?id=1217966&type=pdf&coll=ACM&dl=ACM&CFID=68510919&CFTOKEN=27950676>.

Ozsoyoglu et at, "Querying web metadata: Native score management and text support in databases", Database Systems (TODS), vol. 29, Issue 4 (Dec. 2004), p. 581-634. Retrieved from the Internet: <URL:http://portal.acrn.org/ft_gateway.cfm?id=1042047&type=pdf>.

* cited by examiner

HETEROGENEOUS CONTENT INDEXING AND SEARCHING

RELATED APPLICATIONS

This application is related to U.S. patent application Ser. No. 11/880,281, filed Jul. 20, 2007, and entitled, "INDEXING AND SEARCHING OF INFORMATION INCLUDING HANDLER CHAINING," which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

Computer users have different ways to locate files and other information that may be locally or remotely stored. For example, some operating systems include built-in search wizards that can be used to locate files using keywords and other user input. However, some existing built-in search wizards can be slow and time consuming when performing searches, which can ultimately result in an unsatisfactory user experience. A user may have to abort a search before obtaining any relevant search results adding further inefficiency and dissatisfaction.

Some searching applications use indexing methods to index certain files, using the indexed information when responding to search requests. Indexing is used in efforts to quickly and efficiently return search results. However, many of the current applications are not properly configured to handle cases in which new file types and formats are being created and added to a system. In some cases, a new add-on can be created and introduced to the system to operate with a certain file format. Unfortunately, the creation process can require a large amount of time and learning, and often needs to be repeated for each new file type or format being introduced to a computing environment.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to manage information associated with a number of disparate information sources. In an embodiment, an extensible system is configured to use metadata and other information as part of an indexing operation. A handler can operate to extract, filter, or otherwise assess metadata and other information associated with a number of disparate information sources. In one embodiment, a metadata handler can operate to extract metadata from a data structure and/or a secondary data stream. The extracted metadata can be used as part of an indexing operation for a number of underlying files or other information sources associated with the data structure and/or secondary stream.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are provided to manage information associated with a number of disparate information sources. In an embodiment, an extensible system includes a handler configured to communicate metadata and other information as part of an indexing operation. The handler can operate to extract, filter, or otherwise assess metadata and other information associated with a number of disparate information sources, wherein the metadata and other information can be used for indexing operations, but is not so limited.

In one embodiment, an indexing system includes a metadata handler configured to extract metadata from a data structure and/or a secondary data stream. The data structure can be configured to provide a uniform representation of metadata. The metadata can be associated with a number of underlying files or other information sources. The metadata can be associated with underlying files or other information sources that can include varying formats, properties, and/or parameters. For example, the system can be used to index metadata and content-related parameters associated with video files, image files, audio files, .pdf files, virtual information sources (e.g., blogs, hyperlinks, URLs, etc.) and other information sources. The uniform metadata representation can be used to include metadata from underlying sources that may be otherwise incompatible with one another in their native formats.

Figure 1:
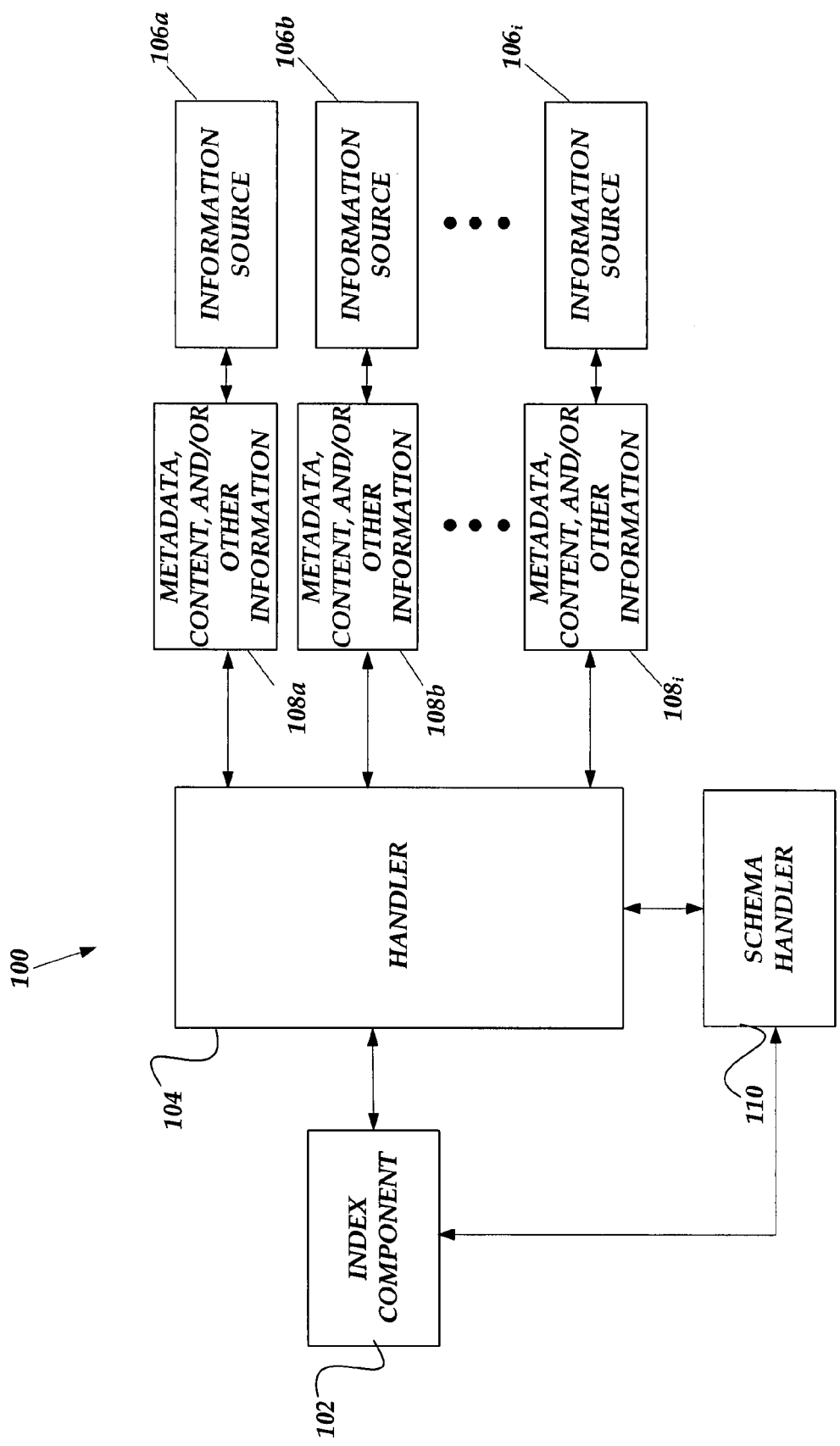
FIG. 1 depicts a block diagram of a system configured to manage information.

FIG. 1 is a block diagram of a system 100 configured to manage information, under an embodiment. As described below, the system 100 includes indexing and searching functionality which includes the use of metadata and other information that is associated with a number of disparate information sources. For example, the system 100 can be used to manage a number of files, file locations, and other information. In one embodiment, the system 100 can be configured to monitor a number of file locations, such as areas of a hard disk for example, and index information associated with the file locations, including metadata and/or other content of the files associated therewith. For example, the system 100 can be configured as a search engine which can operate to index information associated with file locations, files, and other data.

As shown in FIG. 1, the system 100 includes an index component 102 that is configured to use metadata, content, and other information to provide an efficient indexing of information that may be associated with files, file content, virtual content, etc. In one embodiment, the index component 102 can be configured to provide indexing features as part of a search engine's functionality based in part on various intrinsic properties, such as file name, file path, metadata (e.g., creation date, modified date, author, etc.), and/or various extrinsic properties, such as comments and textual content of a file for example.

The index component 102 can use extracted information associated with a number of files or other informational sources to construct an indexed catalog to facilitate efficient and rapid searching. For example, the index component 102 can use text, property information, and metadata extracted from locally stored files and/or remotely networked files when indexing. In one embodiment, the index component 102 is configured to interact with a file system, virtual web, network, or other informational source when indexing according to a desired implementation.

In an embodiment, the index component 102 is configured to monitor certain folders, files, memory locations, or other information sources. Once a file, application, or other informational or data construct has been modified or created, the index component 102 can operate to ascertain identification information associated with the modified or created file, application, or other informational or data construct. For example, if a new file is shown to exist as part of the monitoring process, the index component 102 can operate to determine the new file's extension. According to one embodiment, if the extension is associated with a particular file (e.g., a metadata definition document (MDD) file), the index component 102 looks at its registry and uses a handler 104 (described below) to interact with the particular file.

Accordingly, the handler 104 can be registered with the system 100 for a particular file, such an MDD file for example, or for a number of files or other information sources. For example, a metadata IFilter can be registered with a desktop search engine for a particular file format. As described further below, an MDD file can be created based on an underlying or primary information source, such as a document file, image file, video, file, audio file, virtual information source, etc. That is, the MDD file can store information, including metadata, associated with an underlying information source. In one embodiment, an MDD file is configured to provide a uniform representation of metadata and/or full-text search (FTS) data for any type of file format, including non-file formats.

With continuing reference to FIG. 1, and as described briefly above, the system 100 includes a handler 104. The handler 104 can be configured to interact with any type of metadata and is not limited to handling pre-defined types of metadata. In one embodiment, the handler 104 operates to interact with a file having an extensible markup language (XML) file format which identifies metadata using name-value pairs. Correspondingly, the handler 104 can use the name-value pair metadata descriptors as part of an indexing process. The handler 104 can be configured to extract metadata, content, properties, and/or other information associated with a number of file-based, non-file-based, or other information sources $106a$-$106_i$ (where "i" is an integer).

The handler 104 is configured with filtering functionality and can operate to filter information associated with an information source. For example, the handler 104 can operate to extract metadata from a file or a secondary data stream (e.g., NTFS stream) associated with a file or other data source. In one embodiment, the handler 104 is configured as a metadata IFilter including the associated interface to extract information from a uniform data structure that includes metadata that is associated with an underlying information source $106a$-$106_i$. The information sources $106a$-$106_i$ can also include new files with new file formats and/or pre-existing files having known file formats.

The handler 104 can be configured to locate, assess, and extract metadata, content, and/or other information (depicted as blocks $108a$-$108_i$ in FIG. 1) associated with the number of files $106a$-$106_i$. In one embodiment, the metadata, content, and/or other information (depicted as blocks $108a$-$108_i$) can be associated with a number of secondary files, referred to as MDD files herein. In an alternative embodiment, all, or select portions, of the extracted metadata, content, and/or other information (depicted as blocks $108a$-$108_i$) can be stored in a single container, file, or other data storage.

In one embodiment, the handler 104 can be included as part of the functionality of an assistance application, such as an indexing and searching system. For example, the handler 104 can be used when indexing information stored in a data storage medium, and the indexed information can then be used as part of rich searching operations. The handler 104 can be used to assess metadata associated with file content, non-file based content, virtual content, and other types of information.

For example, metadata may be added or associated with information, irrespective of the content-type. In one embodiment, the handler 104 can be included as part of the functionality of an assistance application, such as a desktop search engine for example, and can be used to examine a number of information sources, including a number of secondary data streams associated with a number of content-based files. For example, the content-based files may reside in an NT File System (NTFS), a file system of MICROSOFT WINDOWS NT and its descendants, WINDOWS 2000, WINDOWS XP, WINDOWS Server, WINDOWS VISTA, etc. The handler 104 can be configured to access the secondary stream and extract any associated metadata for use in indexing and searching operations. Multiple metadata streams can be used to describe different application and other associations.

As shown in FIG. 1, the system also includes a schema handler 110 in communication with the handler 104 and the index component 102. The schema handler 110 includes mapping functionality to provide a mapping interface between the handler 104 and index component 102, but is not so limited. In an alternative embodiment, the schema handler 110 can be included as part of the functionality of the handler 104. In another alternative embodiment, the schema handler 110 can be included as part of the functionality of the index component 102. In one embodiment, the schema handler 110 can be configured to map generic metadata to a metadata field that is understood by the index component 102 and/or associated search engine. Accordingly, the schema handler 110 can operate to map from a first metadata schema to a database metadata schema, generic metadata schema, application-specific metadata schema, or some other schema implementation.

For example, the schema handler 110 may be used with a pre-existing database where it may be cumbersome and inefficient to alter the database schema. As another example, an application may need changing or tweaking over time for various reasons and, as a result, a different schema may need to be introduced. As further example, the schema handler 110 can be used in situations where an application might use different "friendly" or language-specific names for metadata that it exposes to a user. Using a data-driven schema provides flexibility to change the schema and/or the mapping without changing code, thereby providing an extensible application. For example, name-value pairs can be used to define new metadata for different purposes, thereby providing extensible features to the system 100.

As described above, the index component 102 can use the handler 104 to extract and/or return metadata, content, and/or other information for use by the index component 102 and/or other components. The handler 104 can operate with a unified representation of metadata, as described below. For example, the handler 104 can be configured to interact with one or more files having a particular file format that include metadata and associated parameters that are not constrained by the underlying content. The handler 104 can operate to track and return any metadata and/or content to a search engine, an indexing engine, and/or other desired component.

Correspondingly, the index component 102 can use the handler 104 to capture metadata, content, and/or other information associated with an informational source or sources. The index component 102 can use the metadata, content, and/or other information for indexing against the information source or sources, such as a number of disparate file types. Thereafter, the informational source or information associated therewith can be located upon searching on the metadata, content, and/or other information. Accordingly, the index component 102 can use the handler 104 as part of indexing and/or searching operations. In one embodiment, the handler 104 provides a mechanism to unify the representation of metadata for any file format, and provides the associated metadata for use in indexing and/or searching.

In one embodiment, an indexing service can use the handler 104, in the form of a metadata IFilter for example, as an interface to interact with different types of files and/or other information sources (e.g., NFTS streams, etc.). The handler 104 can extract metadata, textual information, contextual information, properties, etc. for inclusion as part of an index associated with the indexing service. The index can be queried to locate desired information associated with the extracted metadata, textual information, contextual information, properties, etc. In another embodiment, the handler 104 can be configured as a dynamic-link library (DLL) that includes an implementation of a metadata IFilter for a specific class of files and/or data streams.

Figure 2:
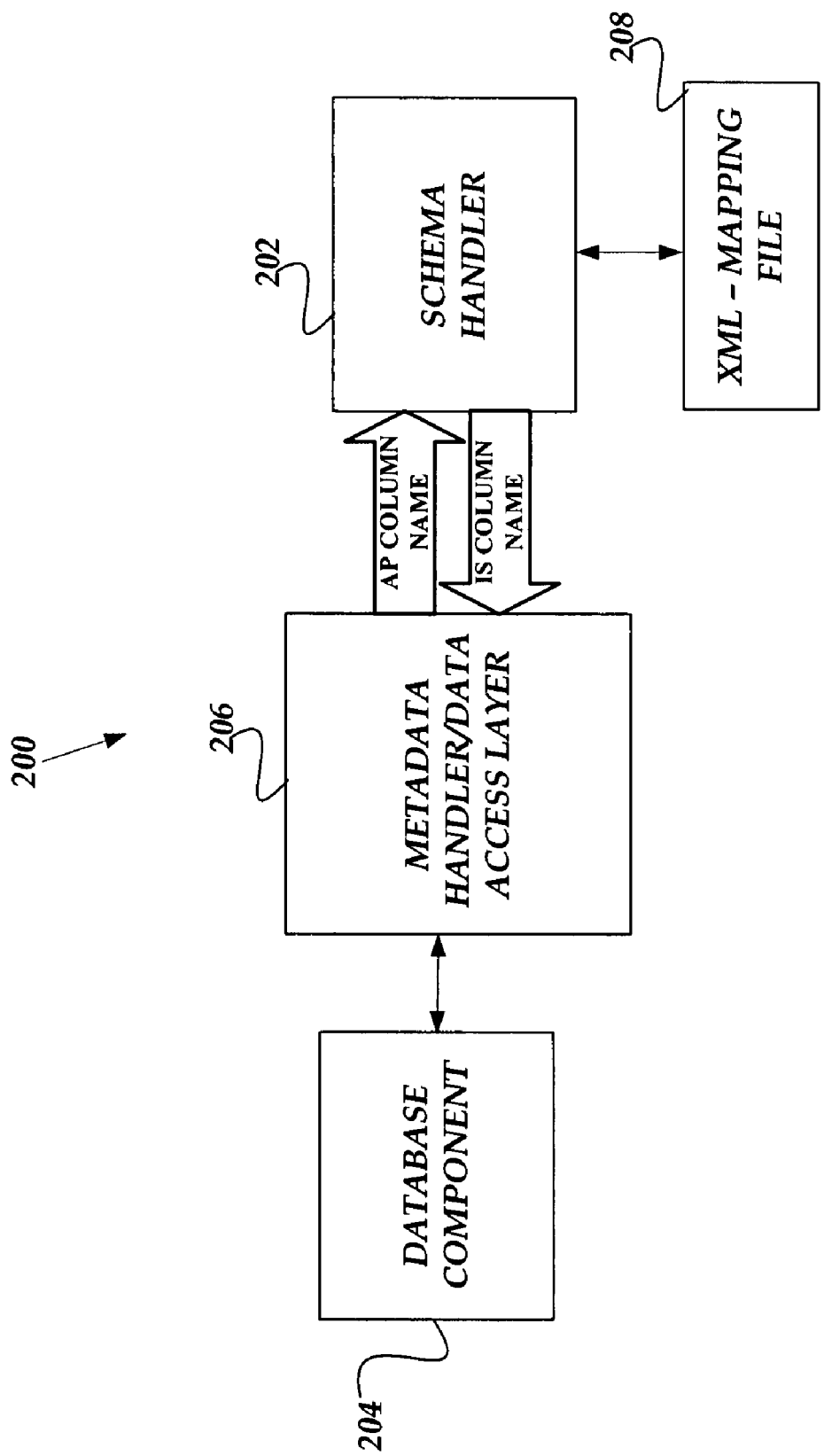
FIG. 2 depicts a block diagram of a system configured to manage information.

FIG. 2 is a block diagram depicting a system 200 that is configured to manage information, in accordance with an embodiment. As shown in FIG. 2, and for illustrative purposes, the schema handler 202 can operate to map a first schema type to a second schema type associated with a database component 204 or other storage component. For example, the schema handler 202 can be used to map application-specific metadata schema to a database metadata schema. Correspondingly, a metadata handler 206 (or data access layer) can use the schema handler 202 to map a first schema type to a second schema type associated with the database component 204. For example, the schema handler 202 can be used as part of an Assistance Platform rich client and the WINDOWS Desktop Search (WDS) database.

According to this embodiment, the schema handler 202 uses an xml-mapping file 208 as part of a mapping process, to thereby provide a data-driven mapping functionality, to map the first schema metadata to the second schema metadata. In one embodiment, the xml-mapping file 208 is a configuration file which includes an array of elements which describe the mapping for certain metadata. For example, the mapping for particular metadata can consist of the following elements: a) a first schema metadata name (e.g., AP) which is a standardized or friendly name which needs to be mapped; b) a second metadata name (e.g., WDS, IS, etc.) which is the name of the metadata in the database (e.g., the database associated with WDS); and, c) the type of the metadata (e.g., string, integer, multi-valued, etc.). In addition to the above array of mapping elements, the xml-mapping file 208 can also include a "catch-all" mapping element which is used to map an unspecified first schema metadata to a multi-valued metadata form in the database component 204.

As an example, the schema handler 202 can be used when using the metadata handler 206 as part of a content-based indexing operation. During the content indexing process, the metadata handler 206 receives an MDD file as an input. The MDD file references names associated with first metadata schema. To ensure correct indexing of the associated content, the first metadata schema (e.g., AP schema metadata) can be mapped to the second metadata schema (e.g., WDS schema metadata). Accordingly, the metadata handler 206 (e.g., metadata IFilter) uses the schema handler 202 to map the AP schema metadata names found in the MDD file to the appropriate metadata names associated with the WDS.

As another example, the schema handler 202 can be used as part of a searching and content retrieval process. In order to perform a search query over the database component 204, any metadata associated with the first schema query needs to be mapped to the metadata names of the second schema. Similarly, any metadata referenced in the search results need to be converted to the metadata names of the first schema. In order to obtain the correct metadata name, a data access layer or other component can use the schema handler 202 to perform the mapping operation.

Figure 3:
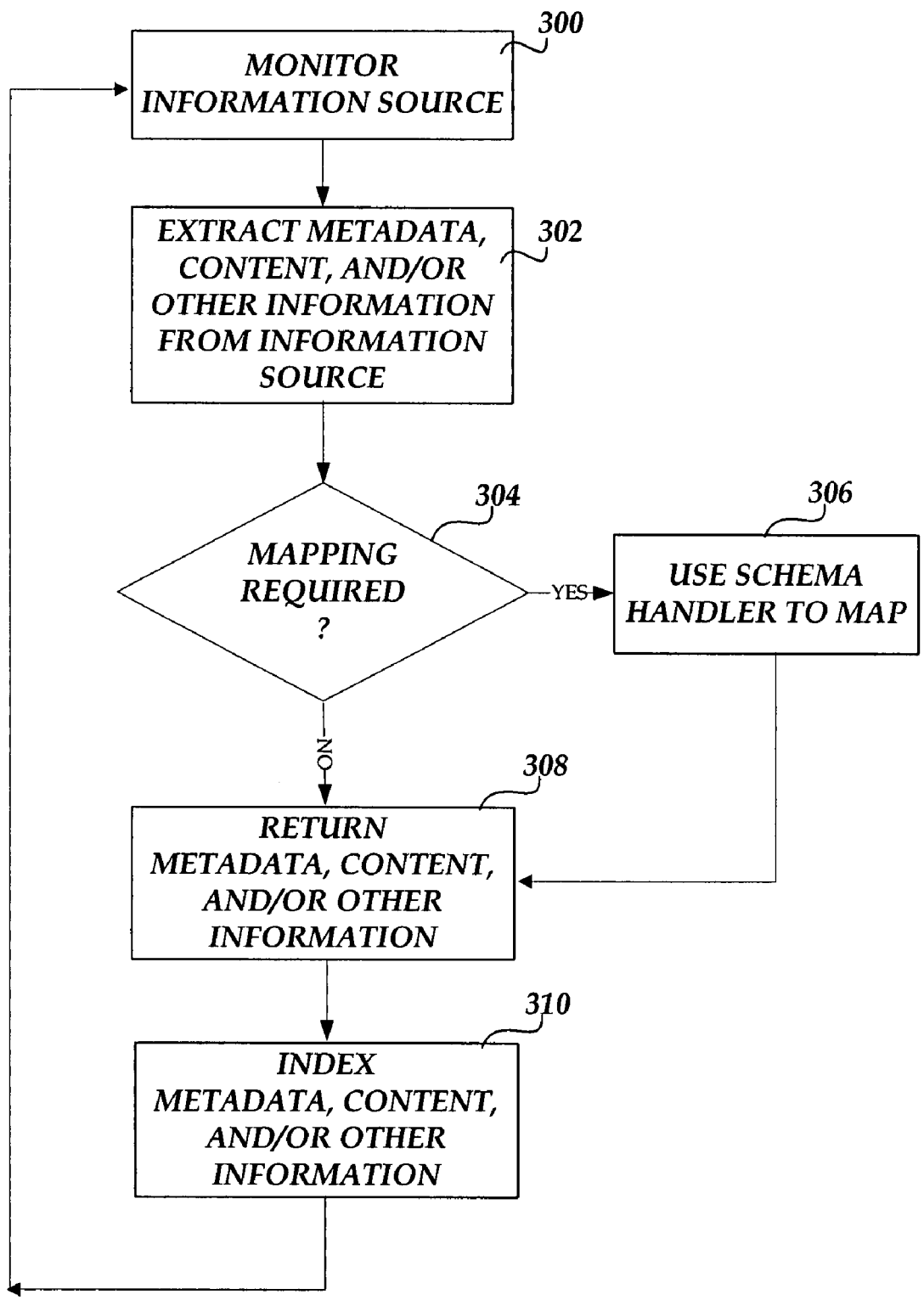
FIG. 3 is a flow diagram illustrating an indexing process.

FIG. 3 is a flow diagram illustrating a process of managing information, in accordance with an embodiment. Components of FIG. 1 are used in the description of FIG. 3, but the embodiment is not so limited. At 300, the index component 102 is monitoring an information source 106$_i$. For example, the index component 102 may be monitoring a local hard disk, file system, folder(s), database, remote information source, or other data source. At 302, the index component 102 can operate to use the handler 104 to extract metadata, content, and/or other information from a select information source 106$_i$. The index component 102 can refer to a persistent handler or GUID when calling the handler 104. For example, the index component 102 can call the handler 104 to extract metadata from a new or recently updated MDD file (described in detail below).

To simplify the discussion of FIG. 3, it is assumed that metadata has been extracted from an information source using the handler 104. After using the handler 104 to extract metadata from the information source 106$_i$, the handler 104 invokes the schema handler 110 if there is a need to map the extracted metadata from a first metadata schema to a second metadata schema. For example, the schema handler 110 can be used to map from an application-specific metadata schema used by the information source 106$_i$, to a metadata schema as understood by the index component 102.

If mapping is required at 304, the schema handler 110 is used to map the metadata from a first metadata schema to a second metadata schema at 306 and the flow proceeds to 308. If mapping is not required at 304, the flow proceeds to 308 and the metadata is returned to the index component 102 for further processing. At 310, the index component 102 operates to index the metadata as part of an indexing operation and associate this metadata with the information source 106$_i$. Thereafter, the indexed metadata can be used to locate information associated with information source 106$_i$ as part of a search. For example, the system 100 can operate to invoke a particular application based on the location, name, etc. of an underlying file or other information source that is associated with an MDD file.

Figure 4:
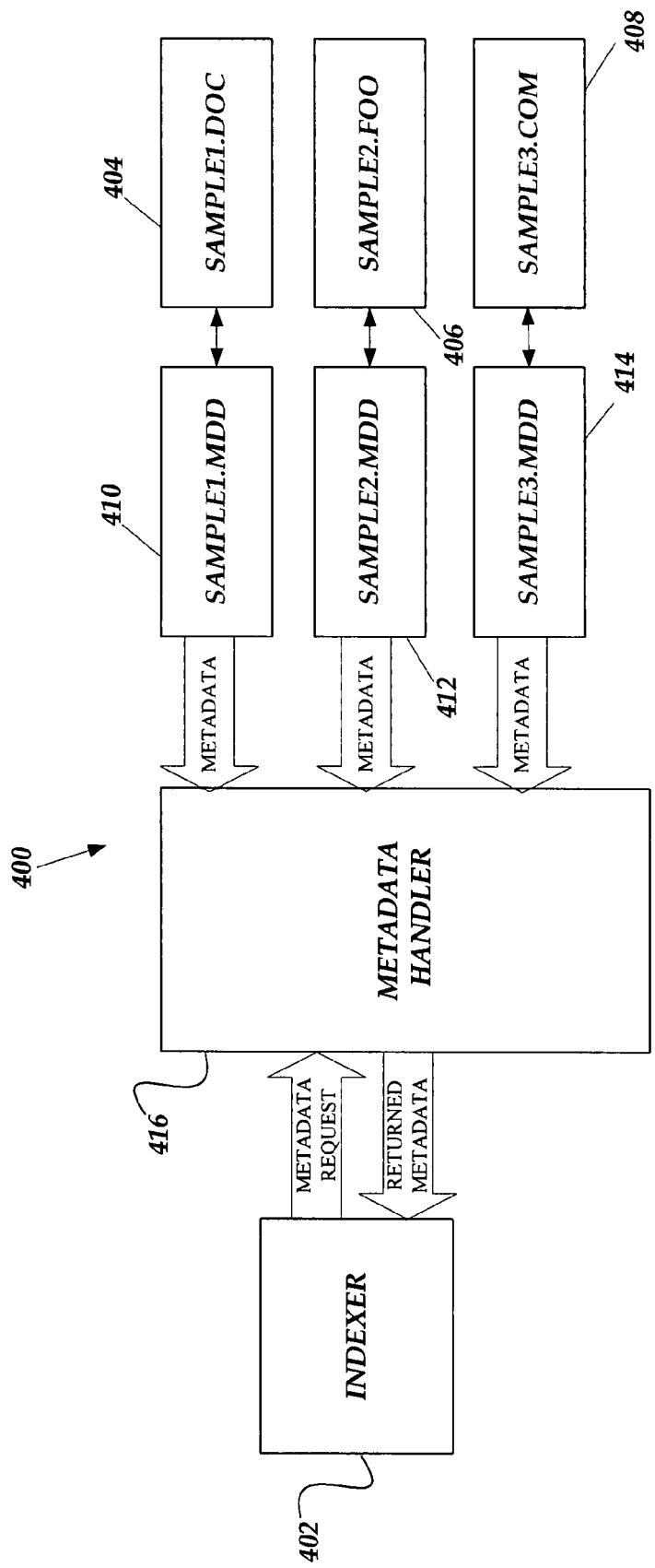
FIG. 4 depicts a block diagram of a system configured to manage information.

FIG. 4 is a block diagram of a system 400 configured to manage information, in accordance with an embodiment. Components of the system 400 can be configured to provide a representation of metadata that can be used as part of a heterogeneous indexing and/or a searching functionality. As shown in FIG. 4, the system 400 includes an indexer 402 that is configured to use metadata, in part, to provide an efficient indexing of information, such as a files, file content, metadata, etc.

The indexer 402 can use metadata and other information associated with a number of files 404 and 406, and other information source 408 to construct an indexed catalog to facilitate efficient and rapid searching. For example, the indexer 402 can use metadata extracted from locally stored files and/or remotely networked files when indexing. The embodiment is not so limited, but to provide an illustrative example of the functionality of the system 400, the files 404 and 406, and the information source 408 are depicted as particular types. However, the system 400 can interact with any number of files and/or other information sources. Moreover, the files and other information sources may be associated with another system, whether local or remote.

As described below, metadata can be associated with the files 404-406, and the information source 408, and stored according to a generic schema such that a single metadata handler can be used to interact with the associated metadata. As shown, block 404 corresponds with a document file (SAMPLE1.DOC). Block 410 depicts a corresponding MDD file (SAMPLE1.MDD) which includes the metadata and/or full-text associated with the document file. As described above, the metadata included in the MDD file is not constrained by the underlying format of the document file. Rather, each MDD file includes a data structure or format that enables the metadata handler 416 to extract or otherwise determine the metadata and other information associated therewith. Correspondingly, the metadata handler 416 can operate to indirectly interact with a number of associated information sources.

File 406 corresponds to a newly created file having a new type of format (SAMPLE2.FOO). Block 412 depicts a corresponding MDD file (SAMPLE2.MDD) which includes the metadata and/or full-text associated with the new file. Again, the metadata included in the MDD file is not constrained by the underlying format of the new file. Information source 408 corresponds with website URL (SAMPLE3.COM). Block 414 is a corresponding MDD file (SAMPLE3.MDD) which includes metadata associated with the website. Accordingly, the metadata included in the MDD file is not constrained by the fact that the underlying information source 408 is a website.

Due in part to the characteristics of the metadata handler 416, such as a metadata IFilter for example, and the MDD files, metadata and/or other information associated with each MDD file can be extracted therefrom or otherwise accessed. The extracted metadata and/or other information can be communicated to the indexer 402 for indexing purposes against the blocks 410, 412, and 414, files 404-406, and the information source 408. In one embodiment, the metadata handler 416 can be configured as an IFilter interface for interacting with an MDD file and/or a data stream associated with an underlying content-based or other type of file.

In an embodiment, one or more of the MDD files can be stored with or as part of an associated content file. In another embodiment, the metadata, content, and other information can be stored in the same file, in different files, or in different file combinations. Each MDD file can include properties to identify the file or informational source that is associated with the metadata. For example, an MDD file can include keywords, file name, author, file type, path, location(s), creation/modification/review date(s), size, binary information, language, custom properties, read/write permissions, and/or other information. In one embodiment, an MDD file can be created by an application configured to create a file having a certain file format and characteristics according to a defined schema.

An MDD file can be used to represent any file format, including existing and new file formats, data structures, or other constructs. For example, an MDD file can be associated with an image file, a document, spreadsheet, blog, uniform resource locator (URL), hyperlink, website, etc. An authoring tool, publishing tool, general purpose creation tool, etc. can be used to create an MDD file. In one embodiment, an application can automatically create an MDD based on an underlying file or other information source. A desired tool can be used to extract metadata from an associated file, application, or other informational or data construct when creating the MDD file.

For example, a metadata extraction tool can be used to create MDD files for document files, spreadsheet files, image files, video files, etc. The tool can be configured to extract metadata, content, and/or other information and publish the same as part of an MDD file. The system 400 can also include functionality to automatically create MDD files by using a sampling tool to extract metadata, content, and/or other information from a file, application, etc. and publish the same as part of an MDD file. As shown below, in one embodiment, a schema can be used to create MDD files using an extensible markup language (XML). Once an MDD file has been identified and/or located, the metadata handler 408 is configured to assess the metadata, content, and/or other information associated therewith for further operations and/or implementations.

Correspondingly, MDD files can be created in various ways and are not intended to be limited to any particular creation mechanism. In one embodiment, an MDD file can be created based in part on an existing metadata-embedded file. To create an MDD file from an existing metadata-embedded file, an associated IFilter for the file can be used to extract the metadata from the existing metadata-embedded file. For instance, a document IFilter can be used to extract metadata from a document file (e.g., .doc, .docx, etc.) when creating an MDD file to be associated with the document file. Code can be written to invoke the document IFilter which extracts metadata and/or full-text search (FTS) data from the document. The code can then create the MDD file associated with the document file including any relevant metadata and FTS data.

In another embodiment, an MDD file can be created using an authoring and publishing system. Such an embodiment can be used to create MDD files when integrated with authoring and publishing systems. An authoring and publishing system is designed to publish an "asset" to an online server, such as a runtime server for example, where assets are aggregated for search and content retrieval. An MDD adapter can be configured to extract metadata from an asset and any FTS data from the asset's associated content when creating an MDD file.

In yet another embodiment, an MDD file can be authored by using an authoring or other tool. A user can author an MDD file when the associated content is non-file based content, such as for a website for example. For example, a user can create an MDD file that includes annotations, keywords, notes, etc. stored as metadata and associated with a .pdf file. The MDD file can be authored as an XML file which can be created with user-specified metadata using a text editor, such as notepad for example. The metadata handler 416 can then operate to extract the metadata from the MDD file for indexing and/or searching operations.

An example schema corresponding to an MDD file is shown below. As shown, the schema is configured to be independent of content-type (virtual, file-based, etc), and can be used to describe metadata for heterogeneous content-types. The schema can include the following:

```xml
<?xml version="1.0" encoding="utf-16"?>
<xs:schema                    attributeFormDefault="unqualified"
elementFormDefault="qualified" xmlns:xs="http://www.w3.org/2001/XMLSchema">
    <xs:element name="assetAttributes">
        <xs:complexType>
            <xs:sequence>
                <xs:element name="assetKey">
                    <xs:complexType>
                        <xs:sequence>
                            <xs:element name="product" type="xs:string" />
                            <xs:element name="productRelease" type="xs:string" />
                            <xs:element name="culture" type="xs:string" />
                            <xs:element name="assetId" type="xs:string" />
                            <xs:element name="assetVersion" type="xs:unsignedByte" />
                        </xs:sequence>
                    </xs:complexType>
                </xs:element>
                <xs:element name="isTocAsset" type="xs:unsignedByte" />
                <xs:element name="isRoot" type="xs:unsignedByte" />
                <xs:element name="isCategory" type="xs:unsignedByte" />
                <xs:element name="assetType" type="xs:string" />
                <xs:element name="title" type="xs:string" />
                <xs:element name="description" />
                <xs:element name="source" type="xs:string" />
                <xs:element name="primaryProxyKey" type="xs:string" />
                <xs:element name="principalAssetKey" type="xs:string" />
                <xs:element name="contentType" type="xs:string" />
                <xs:element name="contentName" type="xs:string" />
                <xs:element name="isPackaged" type="xs:unsignedByte" />
                <xs:element name="isPlaceHolder" type="xs:unsignedByte" />
                <xs:element name="placeHolderId" />
                <xs:element name="collections" />
                <xs:element name="keywords" />
                <xs:element name="parents" />
                <xs:element name="properties" />
            </xs:sequence>
        </xs:complexType>
    </xs:element>
</xs:schema>
```

MDD files can be used for various assets. Each MDD file can include information to identify the associated content. The MDD file can also provide information about specialized applications for different metadata sets associated with the same content. For example, consider an information source which is a jpeg file. The jpeg file may have different applications depending on a use context. The applications may include a Picture Library, a web site, a backup utility, etc. The relevant metadata associated with the jpeg file for each of these applications can be different. Thus, there can be three different MDD files associated with the same content which is the jpeg file, wherein each MDD file describes the metadata for each of the aforementioned applications.

For example, an MDD file for table of content (TOC) assets can include the following:

```xml
<?xml version="1.0" encoding="utf-16"?>
<assetAttributes>
  <assetKey>
    <product>ABC</product>
    <productRelease>VS</productRelease>
    <culture>en-US</culture>
    <assetId>123456-1234-1234-1234-1234567890</assetId>
    <assetVersion>1</assetVersion>
  </assetKey>
  <isTocAsset>1</isTocAsset>
  <assetType>category</assetType>
  <title>Sample toc MDD file</title>
  <description>This is a sample toc MDD file</description>
  <source>http://assistance.com</source>
```

-continued

```xml
  <principalAssetKey>RealAssetsAssetKey</principalAssetKey>
  <isRoot>1</isRoot>
  <isPlaceHolder>1</isPlaceHolder>
  <placeHolderID>C# content</placeHolderID>
  <collections>
    <collection>XYZ </collection>
  </collections>
  <parents>
    <parent   order="1"   primaryParent="1">SomeProduct#-
SomeRelease#en-us#05eee553-6a90-456a-b9e5-fcb423390543#1</parent>
    <parent   order="3"   primaryParent="0">SomeOtherProduct#-
Release1#en-us#098765-1234-5678-9012-1234567890#1</parent>
  <parents>
  <properties>
    <property name="PN0">PV0</property>
    <property name="PN1">PV1</property>
  </properties>
</assetAttributes>
```

Table 1 below includes a description of various elements included above.

TABLE 1

| Item | Description |
| --- | --- |
| assetAttributes | The root element of the MDD file |
| assetKey | This describes the 5-part asset key for this asset. The 5 parts of the asset key can be stored in separate columns. Additionally, the |

TABLE 1-continued

| Item | Description |
|---|---|
| | ToString( ) version of the asset key can be stored in a separate column |
| isTocAsset | Value of 0 or 1 |
| assetType | User-defined asset type |
| Title | Title of the asset |
| Description | Summary/Description of the asset |
| Source | Online source for the asset. If updating assets in the background, use this URL to connect to the server |
| principalAssetKey | Asset key (ToString) of the real asset that this node links to |
| isRoot | Identifies if root node |
| isPlaceHolder | Identifies if place holder |
| placeHolderID | The place holder id of this node if it is a place holder. Ignored if it is not a place holder |
| Collections | An asset can be part of multiple collections. |
| Parents | This multi-value field would be used during filtering and scoping of content. The assetIds of the parents of this toc node. Also specifies the order within the parent. Order is sorted. So if order is 3 and there is no 1 or 2 for this parent, then this node would be displayed as 1$^{st}$ child of the parent |
| primaryParent (attribute on parent) | The toc proxy asset of the primary parent of this node. Used for breadcrumbs |
| properties | This is a bag of properties that the author can specify. These properties can be used during filtering |

An example MDD file for non-table of content (non-TOC) assets can include the following:

```
<?xml version="1.0" encoding="utf-16"?>
<assetAttributes>
 <assetKey>
  <product>ABC</product>
  <productRelease>VS</productRelease>
  <culture>en-US</culture>
  <assetId>01fc4051-2995-4aa0-a19e-c5778153f165</assetId>
  <assetVersion>1</assetVersion>
 </assetKey>
 <isTocAsset>0</isTocAsset>
 <assetType>topic</assetType>
 <title>Sample MDD file</title>
 <description>This is a sample MDD file</description>
 <source>http://assistance.com</source>
 <primaryProxyKey>VS#en-us#123456-6a90-456a-b9e5-fcb423390543#1</primaryProxyKey>
 <contentType>aml</contentType>
 <contentName>sample.aml</contentName>
 <collections>
  <collection>XYZ</collection>
 </collections>
 <keyWords>
  <keyword>sample</keyword>
  <keyword>example</keyword>
 </keywords>
 <queries>
  <query>some query</query>
  <query>some query</query>
 </queries>
 <bestBetQueries>
  <bestBetQuery>some best bet</bestBetQuery>
  <bestBetQuery>some best bet</bestBetQuery>
 </bestBetQueries>
 <properties>
  <property name="PN0">PV0</property>
  <property name="PN1">PV1</property>
 </properties>
 <ftsData>What are the risks of allowing programs through a firewall? When you create an exceptionView definition or open a portView definition in a firewall, you allow a particular program to send information to or from your computer through the firewall. Allowing a program to communicate through a firewall (sometimes called unblocking) is like opening a tiny door in the firewall. Each time you allow an exception or open a port for a program to communicate through a firewall, your computer becomes a bit less secure. The more exceptions or more open ports your firewall has, the more opportunities there are for hackers or malicious software to use one of those openings to spread a worm, access your files, or use your computer to spread malicious software to others. It's generally safer to create exceptions than to open ports. If you open a port, it stays open until you close it, whether or not a program is using it. If you create an exception, the "door" is open only when needed for a particular communication. To help decrease your security risk: Only create an exception or open a port when you really need to, and remove exceptions or close ports that you no longer need. Never create an exception or open a port for a program that you do not recognize. See also Firewall: frequently asked questions What are network categories?
 </ftsData>
</assetAttributes>+
```

Table 2 below includes a description of various elements included above.

TABLE 2

| Item | Description |
| --- | --- |
| assetAttributes | This is the root element of the MDD file |
| assetKey | This describes the 5-part asset key for this asset. The 5 parts of the asset key can be stored in separate columns. Additionally, the ToString( ) version of the asset key can be stored in a separate column |
| isTocAsset | Value of 0 or 1 |
| assetType | User-defined asset type |
| title | Title of the asset |
| Description | Summary/Description of the asset |
| Source | Online source for the asset. If updating assets in the background, use this URL to connect to the server |
| primaryProxyKey | The toc proxy asset to sync to during TOC sync |
| contentType | Extension of the content file associated with this asset. This can also be used for FTS data when chaining. also useful for virtual, binary, and other formats (e.g., URL, STTP, etc.) |
| contentName | Name of the content file. This can also be used during off-line content indexing and for online-cached content indexing |
| collections | An asset can be part of multiple collections. |

TABLE 2-continued

| Item | Description |
| --- | --- |
| | This multi-value field would be used during filtering and scoping of content |
| keywords | A multi-value field specified the keywords associated with this asset. This is used for displayed keyword index |
| properties | This is a bag of properties that the author can specify. These properties can be used during filtering |
| queries | A multi-valued field for query to asset mappings. In their original authored form these distinct objects (not assets), but here they can be mapped to become properties on asset objects |
| bestBetQueries | A multi-valued field for best bets |
| ftsData | fts data for the content can be specified in this field. In some cases, it may not be feasible to specify fts data in the content file (such as for image files, for example). If fts data is specified here, then only this content would be used for fts, and fts data may not be retrieved from the content file |

An additional example of an MDD file is shown below and includes:

```
<assetAttributes>
    <assetKey>
        <assetId>00e69dca-3820-4215-96aa-4fc7ade34aec</assetId>
        <assetVersion>4</assetVersion>
        <culture>en-US</culture>
        <product>ddaf8136-402d-4a02-aa43-c384f26796ea</product>
        <productRelease>CCB2</productRelease>
    </assetKey>
    <isTocAsset>0</isTocAsset>
    <assetType>Topic</assetType>
    <title>Accessibility Products and Services from Microsoft</title>
    <description>
    </description>
    <source>local</source>
    <primaryProxyKey>####</primaryProxyKey>
    <contentType>aml</contentType>
    <contentName>00e69dca-3820-4215-96aa-4fc7ade34aec#en-US#ddaf8136-402d-4a02-aa43-c384f26796ea#CCB2#4</contentName>
    <isPackaged>0</isPackaged>
    <collections />
    <keywords />
    <queries />
    <bestBetQueries />
    <properties>
        <property name="TocTitle">
        </property>
    </properties>
<ftsData>Accessibility Products and Services is committed to making its
products and services easier for everyone to use. The following topics provide information
about the features, products, and services that provide better access for people with
disabilities: 1) Accessibility features in alternative formats; 2) Customer service for people
with hearing impairments. You can contact your subsidiary to find out whether the type of
products and services described in this section are available in your area. The operating
system has many built-in accessibility features that are useful for individuals who have
difficulty typing or using a mouse, are blind or have low vision, or who are deaf or hard-of-
hearing. The features are installed during Setup. Free step-by-step tutorials provide detailed
procedures for adjusting the accessibility options and settings on your computer. This
information is presented in a side-by-side format so that you can learn how to use the mouse,
the keyboard, or a combination of both. Documentation in alternative formats is available for
users who have difficulty reading or handling printed materials. </ftsData>
    </assetAttributes>
```

In one embodiment, a metadata handler can be configured as a software application, including executable instructions, having a number of modules that are configured as follows.

The metadata handler can include an amlProcessor.h module which corresponds with a header file used for processing AML files and includes:

```
#pragma once
#include "stdafx.h"
// CAmlProcessor code derived from APV1 compiler.
class amlProcessor
{
public:
    amlProcessor( ) { };
    ~amlProcessor( ) { };
    void ExtractBody(const CString & amlFile, CComBSTR &bstrBody)
    {
        HRESULT hr = S_OK;
        // Create XML DOM From URL.
        CComPtr       <IXMLDOMDocument2>        pXmlDoc        =
XmlUtil::CreateXmlDomFromUrl(CComBSTR(amlFile));
        if (!pXmlDoc)
        {
            bstrBody = L"";
            return;
        }
        // Set the MAML namespace as the namespace to be
        // used in XPath expressions.
        CCom Variant varValue (GetMamlNamespace( ));
        if (FAILED (hr = pXmlDoc->setProperty(L"SelectionNamespaces",
varValue)))
        {
            bstrBody = L"";
            return;
        }
        CComBSTR bstrXsl(500);
        InitializeXSL(bstrXsl);
        // Create XSL Doc from BSTR
        CComPtr<IXMLDOMDocument2>        pXslDoc        =
XmlUtil::CreateXmlDom(bstrXsl);
        if (!pXslDoc)
        {
            bstrBody = L"";
            return;
        }
        // Use the above xsl transform to extract the body
        if(FAILED (hr = pXmlDoc->transformNode(pXslDoc, &bstrBody)))
        {
            bstrBody = L"";
            return;
        }
    }
private:
    WCHAR *GetamlNamespace( )
    {
        return L"xmlns:maml='http://schemas.microsoft.com/maml/2004/10'";
    }
    void InitializeXSL(CComBSTR &bstrXsl)
    {
        bstrXsl = L"<?xml version=\"1.0\" encoding=\"UTF-8\" ?>\r\n";
        bstrXsl.Append("<xsl:stylesheet             version=\"1.0\"
xmlns:xsl=\"http://www.w3.org/1999/XSL/Transform\" ");
        bstrXsl.Append(GetMamlNamespace( ));
        bstrXsl.Append(" xml:space=\"default\" >\r\n");
        bstrXsl.Append("<xsl:output method=\"text\" indent=\"no\" />\r\n");
        bstrXsl.Append("<xsl:template match=\"/\">\r\n");
        bstrXsl.Append("<xsl:apply-templates />\r\n");
        bstrXsl.Append("</xsl:template>\r\n");
        bstrXsl.Append("<xsl:template match=\"text( )\">\r\n");
        bstrXsl.Append("<xsl:text> </xsl:text><xsl:value-of select=\".\" /><xsl:text
xml:space=\"preserve\"> </xsl:text>\r\n");
        bstrXsl.Append("</xsl:template>\r\n");
        bstrXsl.Append("<xsl:template
match=\"//maml:task[@contentType='ACWProcedure']//maml:taskExecutionBlock\">\r\n");
        bstrXsl.Append("</xsl:template>\r\n");
        bstrXsl.Append("<xsl:template match=\"//maml:title\">\r\n");
        bstrXsl.Append("</xsl:template>\r\n");
        bstrXsl.Append("<xsl:template match=\"//maml:reusableContent\">\r\n");
```

-continued
```
        bstrXsl.Append("</xsl:template>\r\n");
        bstrXsl.Append("</xsl:stylesheet>");
    }
};
```

The metadata handler can include a dll.cpp module which is standard ATL attributed stub code that can be used to generate common DLL exports and includes:

```
// APMetaDataFilter.cpp : Implementation of DLL Exports.
#include "stdafx.h"
#include "hxutil.h"
#include "resource.h"
// The module attribute causes DllMain,
DllRegisterServer and DllUnregisterServer to be
automatically implemented
        [ module(dll, uuid =
        "{94727D5F-9450-4160-8B42-E7E55B910D0B}",
```

-continued
```
        name = "MDDFilter",
        helpstring = "Ap MDD IFilter 1.0 Type Library",
        resource_name = "IDR_MDDFILT") ];
```

The metadata handler can include a mddfilt.cpp module which implements the IFilter COM interface. An index component can operate to call the mddfilt.cpp module after encountering a file, such as an MDD file for example, or information associated therewith, to thereby request the associated metadata and/or full-text data. The mddfilt.cpp includes the following:

[00272] #include "windows.h"
[00273] #include "stdafx.h"

[001048]     FreeLibrary(hNlsdll);
[001049]     hNlsdll = NULL;
[001050]     }
[001051]     // Look up registry.
[001052]     HKEY hLCIDKey = NULL;
[001053]     if (RegOpenKeyExW(HKEY_LOCAL_MACHINE,LCID_REGISTRYKEY, 0, KEY_QUERY_VALUE, &hLCIDKey) != ERROR_SUCCESS)
[001054]     {
[001055]         ApThrow(MDDFiltException(L"Unable to open LCID Registry Key"));
[001056]     }
[001057]     DWORD lcid;
[001058]     DWORD bufferLen = sizeof(lcid);
[001059]     DWORD type = 0;
[001060]     if (RegQueryValueExW(hLCIDKey, (LPCWSTR)culture, NULL, &type, (LPBYTE)&lcid, &bufferLen) != ERROR_SUCCESS)
[001061]     {
[001062]         RegCloseKey(hLCIDKey);
[001063]         ApThrow(MDDFiltException(L"Unable to query Registry Key to obtain lcid"));
[001064]     }
[001065]     if (type != REG_DWORD)
[001066]     {
[001067]         RegCloseKey(hLCIDKey);
[001068]         ApThrow(MDDFiltException(L"Invalid type for lcid. Expecting DWORD"));
[001069]     }
[001070]     RegCloseKey(hLCIDKey);
[001071]     m_locale = lcid;
[001072] }

[00274] #include "mddfilt.h"
[00275] #include <strsafe.h>
[00276] #include <stdio.h>
[00277] #include <ntquery.h>
[00278] MDDFilt::MDDFilt()
[00279] {
[00280] m_loadFailed = true;
[00281] m_initFailed = true;
[00282] m_assetKeyFound = false;
[00283] m_locale = GetUserDefaultLCID(); // Will be set when we parse the asset key
[00284] m_pLinkedDocumentFilter = NULL;
[00285] m_Text = L"";
[00286] m_numCharsLeft = 0;
[00287] try
[00288] {
[00289] m_pSchemaHandler = new SchemaHandler(L"WDS");
[00290] }
[00291] catch(SchemaHandlerFileNotLoadedException e)
[00292] {
[00293] }
[00294] catch(SchemaHandlerBadFileException e)
[00295] {
[00296] }
[00297] }
[00298] MDDFilt::~MDDFilt()
[00299] {
[00300] }
[00301] // Index component initialized the filter using this method.
[00302] STDMETHODIMP MDDFilt::Init(
[00303] ULONG grfFlags,
[00304] ULONG cAttributes,
[00305] FULLPROPSPEC const * aAttributes,
[00306] ULONG * pFlags
[00307] )

[00308] {
[00309] MDDFILT_COM_BEGIN(hr);
[00310] if (m_loadFailed) // Either no Load call or the Load Failed.
[00311] {
[00312] return E_FAIL;
[00313] }
[00314] // Ok. sucessful load of MDD.
[00315] *pFlags = 0;
[00316] m_currentChunkIter = m_properties.begin();
[00317] m_chunkId = 1;
[00318] m_lastEmittedChunkType = ChunkNone;
[00319] m_pendingPropertyChunk = false;
[00320] m_textOnly = false;
[00321] if ((grfFlags & IFILTER_INIT_APPLY_INDEX_ATTRIBUTES) == 0)
[00322] {
[00323] m_textOnly = true;
[00324] }
[00325] if (aAttributes || (!aAttributes && cAttributes != 0)) //ability to index the desired props.
[00326] {
[00327] return E_FAIL;
[00328] }
[00329] if (m_pLinkedDocumentFilter) // Init a Linked Document Filter. (Created during Load)
[00330] {
[00331] ULONG dwFlags;
[00332] HRESULT hr = m_pLinkedDocumentFilter->Init(IFILTER_INIT_INDEXING_ONLY, 0, NULL, &dwFlags);
[00333] if (hr != S_OK) // Just Skip Full Text Indexing.
[00334] {
[00335] m_pLinkedDocumentFilter = NULL;
[00336] }
[00337] }
[00338] m_initFailed = false;

[00339] return S_OK;
[00340] MDDFILT_COM_END(hr);
[00341] }
[00342] // return all property chunks. then the Text Chunks.
[00343] // If Document if AML or we have embedded FTS data, can return just one chunk
[00344] // If there is a non-aml linked doc, we pass on to that for Text.
[00345] STDMETHODIMP MDDFilt::GetChunk(STAT_CHUNK * pStat)
[00346] {
[00347] MDDFILT_COM_BEGIN(hr);
[00348] if (m_loadFailed || m_initFailed)
[00349] {
[00350] return FILTER_E_END_OF_CHUNKS;
[00351] }
[00352] if (m_chunkId == 1)
[00353] {
[00354] m_currentChunkIter = m_properties.begin();
[00355] }
[00356] else
[00357] {
[00358] if (m_currentChunkIter != m_properties.end())
[00359] {
[00360] m_currentChunkIter++;
[00361] }
[00362] }
[00363] // return Property Chunks first.
[00364] // return Text chunk(s) last.
[00365] if (m_textOnly || m_currentChunkIter == m_properties.end()) // No more Props. text.
[00366] {
[00367] return GetTextChunk(pStat);
[00368] }
[00369] else
[00370] {
[00371] // Assumes m_currentChunkIter is valid.

[00372]     return GetPropertyChunk(pStat);
[00373]   }
[00374]   MDDFILT_COM_END(hr);
[00375] }
[00376] //Retrieves the IFilter chunk for current property (m_currentChunkIter). Assumes Iterator is valid.
[00377] HRESULT MDDFilt::GetPropertyChunk(STAT_CHUNK *pStat)
[00378] {
[00379]   // Ok. No more. (this condition may_not_ be hit)
[00380]   if (m_currentChunkIter == m_properties.end())
[00381]   {
[00382]     return FILTER_E_END_OF_CHUNKS;
[00383]   }
[00384]   m_pendingPropertyChunk = true;
[00385]   m_lastEmittedChunkType = ChunkValue;
[00386]   pStat->idChunk = m_chunkId;
[00387]   pStat->breakType = CHUNK_NO_BREAK;
[00388]   pStat->flags = CHUNK_VALUE;
[00389]   pStat->locale = m_locale;
[00390]   pStat->attribute = (m_currentChunkIter->second).GetFullPropSpec();
[00391]   pStat->idChunkSource = m_chunkId;
[00392]   pStat->cwcStartSource = 0;
[00393]   pStat->cwcLenSource = 0;
[00394]   m_chunkId++;
[00395]   return S_OK;
[00396] }
[00397] // Get a chunk corresponding to Text.
[00398] // get from <contentName> element (chained filter) or <ftsdata> element.
[00399] HRESULT MDDFilt::GetTextChunk(STAT_CHUNK *pStat)
[00400] {
[00401]   if (m_pLinkedDocumentFilter) // Linked Fts data.
[00402]   {
[00403]     HRESULT hr = S_OK;
[00404]     STAT_CHUNK stat;

```
[00405]        hr = m_pLinkedDocumentFilter->GetChunk(&stat);
[00406]        if (FAILED(hr) || hr != S_OK)
[00407]        {
[00408]           return FILTER_E_END_OF_CHUNKS;
[00409]        }
[00410]        // initialized linked doc to return text.
[00411]        // If it returns a Value, potential bug or a problem in chained IFilter.
[00412]        if (stat.flags == CHUNK_VALUE)
[00413]        {
[00414]           return FILTER_E_END_OF_CHUNKS;
[00415]        }
[00416]        else // Pass it onto caller. Just change the chunk ID.
[00417]        {
[00418]           *pStat = stat;
[00419]           pStat->idChunk = m_chunkId;
[00420]           pStat->idChunkSource = m_chunkId;
[00421]           m_chunkId++;
[00422]           m_lastEmittedChunkType = ChunkText;
[00423]           return S_OK;
[00424]        }
[00425]     }
[00426]     else // Embedded Text. Either from aml file or <ftsdata> element.
[00427]     {
[00428]        // emit one text chunk in case of embedded ftsdata.
[00429]        // Since Text Chunks may be emitted only after Prop Chunks.
[00430]        if (m_lastEmittedChunkType == ChunkText)
[00431]        {
[00432]           return FILTER_E_END_OF_CHUNKS;
[00433]        }
[00434]        // Our Embedded Text Chunk <ftsdata>
[00435]        pStat->idChunk = m_chunkId;
[00436]        pStat->breakType = CHUNK_NO_BREAK;
[00437]        pStat->flags = CHUNK_TEXT;
[00438]        pStat->locale = m_locale;
```

[00439]     pStat->attribute.guidPropSet = StoragePropSet ;

[00440]     pStat->attribute.psProperty.ulKind = PRSPEC_PROPID ;

[00441]     pStat->attribute.psProperty.propid = PID_STG_CONTENTS;

[00442]     pStat->idChunkSource = m_chunkId;

[00443]     pStat->cwcStartSource = 0;

[00444]     pStat->cwcLenSource = 0;

[00445]     m_chunkId++;

[00446]     m_lastEmittedChunkType = ChunkText;

[00447]     return S_OK;

[00448]     }

[00449]   return FILTER_E_END_OF_CHUNKS;

[00450] }

[00451] // Return the Text requested by the index component.

[00452] // preceded by a GetChunk which returned a TEXT chunk.

[00453] STDMETHODIMP MDDFilt::GetText(ULONG * pcwcBuffer, WCHAR * awcBuffer)

[00454] {

[00455]   MDDFILT_COM_BEGIN(hr);

[00456]   if (m_loadFailed || m_initFailed)

[00457]   {

[00458]     return FILTER_E_NO_TEXT;

[00459]   }

[00460]   if (m_lastEmittedChunkType != ChunkText)

[00461]   {

[00462]     return FILTER_E_NO_TEXT;

[00463]   }

[00464]   if (m_pLinkedDocumentFilter) // Linked Text

[00465]   {

[00466]     return m_pLinkedDocumentFilter->GetText(pcwcBuffer, awcBuffer);

[00467]   }

[00468]   else // Embedded Text

[00469]   {

[00470]     HRESULT hr = S_OK;

[00471]     if (m_numCharsLeft == 0)

[00472] {
[00473] return FILTER_E_NO_MORE_TEXT;
[00474] }
[00475] ULONG totalLen = m_Text.Length();
[00476] if (m_numCharsLeft > totalLen) //Weirdness.
[00477] {
[00478] return FILTER_E_NO_MORE_TEXT;
[00479] }
[00480] ULONG offset = totalLen - m_numCharsLeft;
[00481] WCHAR *text = m_Text;
[00482] if (m_numCharsLeft < *pcwcBuffer) //Last of the text block
[00483] {
[00484] errno_t err = wmemcpy_s(awcBuffer, *pcwcBuffer, text+offset, m_numCharsLeft);
[00485] if (err)
[00486] {
[00487] return HRESULT_FROM_WIN32(err);
[00488] }
[00489] *pcwcBuffer = m_numCharsLeft;
[00490] m_numCharsLeft = 0;
[00491] return FILTER_S_LAST_TEXT;
[00492] }
[00493] else
[00494] {
[00495] errno_t err = wmemcpy_s(awcBuffer, *pcwcBuffer, text+offset, *pcwcBuffer);
[00496] m_numCharsLeft -= *pcwcBuffer;
[00497] return HRESULT_FROM_WIN32(err);
[00498] }
[00499] }
[00500] return FILTER_E_NO_MORE_TEXT;
[00501] MDDFILT_COM_END(hr);
[00502] }
[00503] // Return the Property which requested by the index component.

[00504] // preceded by a GetChunk which returned a VALUE chunk.
[00505] STDMETHODIMP MDDFilt::GetValue(PROPVARIANT **ppPropValue)
[00506] {
[00507]    MDDFILT_COM_BEGIN(hr);
[00508]    if (m_loadFailed || m_initFailed)
[00509]    {
[00510]      return FILTER_E_NO_VALUES;
[00511]    }
[00512]    if (m_lastEmittedChunkType != ChunkValue) // GetChunk not called!
[00513]    {
[00514]      return FILTER_E_NO_VALUES;
[00515]    }
[00516]    if (!m_pendingPropertyChunk) //GetValue already called.
[00517]    {
[00518]      return FILTER_E_NO_MORE_VALUES;
[00519]    }
[00520]    if (m_currentChunkIter != m_properties.end())
[00521]    {
[00522]     try
[00523]     {
[00524]       *ppPropValue = (m_currentChunkIter->second).GetPropVariant();
[00525]     }
[00526]     catch (MDDFiltOutOfMemoryException e)
[00527]     {
[00528]       return E_OUTOFMEMORY;
[00529]     }
[00530]    }
[00531]    else //Badness. Chunked more than we can give.
[00532]    {
[00533]      return FILTER_E_NO_VALUES;
[00534]    }
[00535]    m_pendingPropertyChunk = false;
[00536]    return S_OK;
[00537]    MDDFILT_COM_END(hr);

[00538] }

[00539] // Not implemented. IFilter::BindRegion.

[00540] STDMETHODIMP MDDFilt::BindRegion(FILTERREGION origPos, const IID &riid, void ** ppunk)

[00541] {

[00542]     MDDFILT_COM_BEGIN(hr);

[00543]     return E_NOTIMPL;

[00544]     MDDFILT_COM_END(hr);

[00545] }

[00546] // for IPersist Interface.

[00547] STDMETHODIMP MDDFilt::GetClassID(CLSID * pClassID)

[00548] {

[00549]     MDDFILT_COM_BEGIN(hr);

[00550]     // TODO: Change this!

[00551]     CComBSTR ourUniversalID = L"{ACA0BF5C-A5A9-11DA-8A7A-0008744F4E8A}";

[00552]     HRESULT hr;

[00553]     hr = CLSIDFromString( ourUniversalID, pClassID );

[00554]     if( hr == E_FAIL )

[00555]     {

[00556]       return E_FAIL;

[00557]     }

[00558]     return S_OK;

[00559]     MDDFILT_COM_END(hr);

[00560] }

[00561] // IPersist::IsDirty

[00562] STDMETHODIMP MDDFilt::IsDirty()

[00563] {

[00564]     MDDFILT_COM_BEGIN(hr);

[00565]     return S_FALSE;

[00566]     MDDFILT_COM_END(hr);

[00567] }

[00568] // IPersist::Load.

[00569] // One of the ways to load the mdd file.

[00570] STDMETHODIMP MDDFilt::Load(LPCWSTR pszFileName, DWORD dwMode)
[00571] {
[00572]   MDDFILT_COM_BEGIN(hr);
[00573]   m_mddFileName = pszFileName;
[00574]   m_loadFailed = true;
[00575]   m_assetKeyFound = false;
[00576]   m_pLinkedDocumentFilter = NULL;
[00577]   m_Text = L"";
[00578]   m_numCharsLeft = 0;
[00579]   try
[00580]   {
[00581]     ParseFile(m_mddFileName);
[00582]   }
[00583]   catch(MDDFiltOutOfMemoryException)
[00584]   {
[00585]     hr = E_OUTOFMEMORY;
[00586]   }
[00587]   catch(...)
[00588]   {
[00589]     hr = E_FAIL;
[00590]   }
[00591]   m_loadFailed = false;
[00592]   MDDFILT_COM_END(hr);
[00593] }
[00594] // Not impl. IPersist::Save
[00595] STDMETHODIMP MDDFilt::Save(LPCWSTR pszFileName, BOOL fRemember)
[00596] {
[00597]   MDDFILT_COM_BEGIN(hr);
[00598]   return E_FAIL;
[00599]   MDDFILT_COM_END(hr);
[00600] }
[00601] // Not impl. IPersist::SaveCompleted

[00602] STDMETHODIMP MDDFilt::SaveCompleted(LPCWSTR pszFileName)
[00603] {
[00604]    MDDFILT_COM_BEGIN(hr);
[00605]    return S_OK;
[00606]    MDDFILT_COM_END(hr);
[00607] }
[00608] // Not Impl. IPersist::GetCurFile.
[00609] STDMETHODIMP MDDFilt::GetCurFile(LPWSTR * ppszFileName)
[00610] {
[00611]    MDDFILT_COM_BEGIN(hr);
[00612]    return S_OK;
[00613]    MDDFILT_COM_END(hr);
[00614] }
[00615] // IPersistStream::Load
[00616] // Similar to IPersist::Load
[00617] // The mdd file as a stream.
[00618] STDMETHODIMP MDDFilt::Load(IStream *pstm)
[00619] {
[00620]    MDDFILT_COM_BEGIN(hr);
[00621]    m_mddFileName = L"";
[00622]    m_loadFailed = true;
[00623]    m_assetKeyFound = false;
[00624]    m_pLinkedDocumentFilter = NULL;
[00625]    m_Text = L"";
[00626]    m_numCharsLeft = 0;
[00627]    try
[00628]    {
[00629]      ParseStream(pstm);
[00630]    }
[00631]    catch(MDDFiltOutOfMemoryException)
[00632]    {
[00633]      hr = E_OUTOFMEMORY;
[00634]    }
[00635]    catch(...)

[00636] {
[00637] hr = E_FAIL;
[00638] }
[00639] m_loadFailed = false;
[00640] MDDFILT_COM_END(hr);
[00641] }
[00642] // IPersistStream
[00643] STDMETHODIMP MDDFilt::Save(IStream *pstrm, BOOL fclearDirty)
[00644] {
[00645] MDDFILT_COM_BEGIN(hr);
[00646] return E_NOTIMPL;
[00647] MDDFILT_COM_END(hr);
[00648] }
[00649] // IPersistStream
[00650] STDMETHODIMP MDDFilt::GetSizeMax(ULARGE_INTEGER *pcbSize)
[00651] {
[00652] MDDFILT_COM_BEGIN(hr);
[00653] return E_NOTIMPL;
[00654] MDDFILT_COM_END(hr);
[00655] }
[00656] // Called by IPersistStream::Load.
[00657] void MDDFilt::ParseStream(IStream *pStrm)
[00658] {
[00659] CComPtr <IStream> pXml = pStrm;
[00660] CComPtr <IXMLDOMDocument2> pMddDom = XmlUtil::CreateXmlDom(pXml);
[00661] if (!pMddDom)
[00662] {
[00663] ApThrow(MDDFiltFileNotLoadedException(L"Could not create XML Dom"));
[00664] }
[00665] // Main Parsing Routine.
[00666] ParseMddDom(pMddDom);
[00667] }

[00668] // Called by IPersist::Load.

[00669] void MDDFilt::ParseFile(const CString &fileName)

[00670] {

[00671] CComPtr <IXMLDOMDocument2> pMddDom = XmlUtil::CreateXmlDomFromUrl(CComBSTR(fileName));

[00672] if (!pMddDom)

[00673] {

[00674] ApThrow(MDDFiltFileNotLoadedException(L"Could not create XML Dom"));

[00675] }

[00676] // Main Parsing Routine.

[00677] ParseMddDom(pMddDom);

[00678] }

[00679]

[00680] // Main Parsing Routine.

[00681] // Parses the file, fills in the appropriates structures (m_properties, etc.)

[00682] void MDDFilt::ParseMddDom(const CComPtr <IXMLDOMDocument2> & pMddDom)

[00683] {

[00684] HRESULT hr = S_OK;

[00685] CComPtr <IXMLDOMElement> pAssetAttributes;

[00686] hr = pMddDom->get_documentElement(&pAssetAttributes);

[00687] ApHrCheck(hr, COMException(hr, L"No asset Attributes"));

[00688] // Retrieve Content Type First. Need this in case content is aml and process <contentName>

[00689] // before <contentType>

[00690] CComPtr <IXMLDOMNode> pAssetAttrNode = pAssetAttributes;

[00691] try

[00692] {

[00693] m_contentType = XmlUtil::GetStringValueFromXmlDom(pAssetAttrNode,L"contentType");

[00694] }

[00695] catch(XPathNotFoundException) // contentType is not mandatory. Catch exception and ignore.

[00696] {
[00697] }
[00698] CComPtr <IXMLDOMNodeList> pChildNodes;
[00699] hr = pAssetAttributes->get_childNodes(&pChildNodes);
[00700] ApHrCheck(hr, COMException(hr, L"No children of assetAttributes"));
[00701] long numChildren = 0;
[00702] hr = pChildNodes->get_length(&numChildren);
[00703] ApHrCheck(hr, COMException(hr, L"No Children of assetAttributes"));
[00704] for (long i = 0; i < numChildren; i++)
[00705] {
[00706] CComPtr <IXMLDOMNode> pChild;
[00707] hr = pChildNodes->nextNode(&pChild);
[00708] ApHrCheck(hr, COMException(hr, L"NextNode Failed"));
[00709] ProcessNode(pChild);
[00710] }
[00711] if (!m_assetKeyFound) //Asset Key is Mandatory
[00712] {
[00713] ApThrow(MDDFiltAssetKeyNotFoundException(L"No Asset Key element"));
[00714] }
[00715] }
[00716] // Process specified sub element of <assetAttribute>
[00717] void MDDFilt::ProcessNode(const CComPtr <IXMLDOMNode> &pNode)
[00718] {
[00719] CComBSTR name;
[00720] HRESULT hr = S_OK;
[00721] hr = pNode->get_baseName(&name);
[00722] ApHrCheck(hr, COMException(hr, L"Unable to get Element Name"));
[00723] CString nameString = (WCHAR *)name;
[00724] if (nameString.CompareNoCase(L"assetKey") == 0)
[00725] {
[00726] return ProcessAssetKey(pNode);
[00727] }
[00728] if (nameString.CompareNoCase(L"collections") == 0)

[00729] {
[00730] return ProcessSubElements(pNode, L"Collection");
[00731] }
[00732] if (nameString.CompareNoCase(L"properties") == 0)
[00733] {
[00734] return ProcessProperties(pNode);
[00735] }
[00736] if (nameString.CompareNoCase(L"parents") == 0)
[00737] {
[00738] return ProcessParents(pNode);
[00739] }
[00740] if (nameString.CompareNoCase(L"keywords") == 0)
[00741] {
[00742] return ProcessSubElements(pNode,L"Keywords");
[00743] }
[00744] if (nameString.CompareNoCase(L"contentName") == 0) // companion file.
[00745] {
[00746] return ProcessLinkedFullTextData(pNode);
[00747] }
[00748] if (nameString.CompareNoCase(L"ftsdata") == 0)
[00749] {
[00750] return ProcessEmbeddedFullTextData(pNode);
[00751] }
[00752] if (nameString.CompareNoCase(L"queries") == 0) // Query To Asset Mapping.
[00753] {
[00754] return ProcessSubElements(pNode,L"Queries");
[00755] }
[00756] CComBSTR val;
[00757] hr = pNode->get_text(&val);
[00758] ApHrCheck(hr, MDDFiltException(L"Unable to get text"));
[00759] CString valString = (WCHAR *)val;
[00760] AddProperty(nameString, valString);
[00761] }

[00762] // Adds attribute to m_properties, which is used to return values in GetChunk and GetValue.

[00763] void MDDFilt::AddProperty(const CString &nameString, const CString &val)

[00764] {

[00765]     GUID guid = m_pSchemaHandler->GetDBAttributeGUID(nameString);

[00766]     PROPID id = m_pSchemaHandler->GetDBAttributeID(nameString);

[00767]     VARTYPE type = m_pSchemaHandler->GetDBAttributeType(nameString);

[00768]     pair <CString, CString> attrVal = m_pSchemaHandler->GetDBAttributeValuePair(nameString, val);

[00769]     CString valString = attrVal.second;

[00770]     pair <GUID, PROPID> propKey;

[00771]     propKey.first = guid;

[00772]     propKey.second = id;

[00773]     propertyIter i = m_properties.find(propKey);

[00774]     if (i == m_properties.end()) // New Property

[00775]     {

[00776]       Property prop(guid,id, type);

[00777]       m_properties[propKey] = prop;

[00778]       m_properties[propKey].AppendValue(valString);

[00779]     }

[00780]     else // already seen this one

[00781]     {

[00782]       if (m_pSchemaHandler->IsMultiValued(nameString))

[00783]       {

[00784]         (i->second).AppendValue(valString);

[00785]       }

[00786]     }

[00787] }

[00788] // Parse Asset Key and AddProperty relevant properties.

[00789] // Also add a ToString ("#" separated) representation of AssetKey

[00790] void MDDFilt::ProcessAssetKey(const CComPtr <IXMLDOMNode> &pNode)

[00791] {

[00792]     #define SEP L"#"

[00793]     m_assetKeyFound = false;

[00794] CString product = XmlUtil::GetStringValueFromXmlDom(pNode,L"product");
[00795] if (product.GetLength() == 0)
[00796] {
[00797] throw MDDFiltAssetKeyNotFoundException(L"Missing Product");
[00798] }
[00799] AddProperty(L"Product", product);
[00800] CString assetKey = product;
[00801] assetKey += SEP;
[00802] CString productRelease = XmlUtil::GetStringValueFromXmlDom(pNode,L"productRelease");
[00803] if (productRelease.GetLength() == 0)
[00804] {
[00805] throw MDDFiltAssetKeyNotFoundException(L"Missing Product Release");
[00806] }
[00807] AddProperty(L"ProductRelease", productRelease);
[00808] assetKey += productRelease;
[00809] assetKey += SEP;
[00810] CString culture = XmlUtil::GetStringValueFromXmlDom(pNode,L"culture");
[00811] if (culture.GetLength() == 0)
[00812] {
[00813] throw MDDFiltAssetKeyNotFoundException(L"Missing Culture");
[00814] }
[00815] AddProperty(L"Culture", culture);
[00816] SetLCID(culture);
[00817] assetKey += culture;
[00818] assetKey += SEP;
[00819] CString assetId = XmlUtil::GetStringValueFromXmlDom(pNode,L"assetId");
[00820] if (assetId.GetLength() == 0)
[00821] {
[00822] throw MDDFiltAssetKeyNotFoundException(L"Missing AssetID");
[00823] }
[00824] AddProperty(L"AssetId", assetId);
[00825] assetKey += assetId;

[00826] assetKey += SEP;

[00827] CString assetVersion = XmlUtil::GetStringValueFromXmlDom(pNode,L"assetVersion");

[00828] if (assetVersion.GetLength() == 0)

[00829] {

[00830] throw MDDFiltAssetKeyNotFoundException(L"Missing Asset Version");

[00831] }

[00832] AddProperty(L"AssetVersion", assetVersion);

[00833] assetKey += assetVersion;

[00834] AddProperty(L"AssetKey", assetKey);

[00835] m_assetKeyFound = true;

[00836] }

[00837] // Process a node which has children.

[00838] // columnName is the column in which each child goes.

[00839] void MDDFilt::ProcessSubElements(const CComPtr <IXMLDOMNode> &pNode, const CString &columnName)

[00840] {

[00841] HRESULT hr = S_OK;

[00842] CComPtr <IXMLDOMNodeList> pChildNodes;

[00843] hr = pNode->get_childNodes(&pChildNodes);

[00844] ApHrCheck(hr, MDDFiltException(L"ProcessSubElements: No children"));

[00845] if (!pChildNodes)

[00846] {

[00847] return;

[00848] }

[00849] long numChildren = 0;

[00850] hr = pChildNodes->get_length(&numChildren);

[00851] ApHrCheck(hr, COMException(hr, L"ProcessSubElements: No length"));

[00852] for (long i = 0; i < numChildren; i++)

[00853] {

[00854] CComPtr <IXMLDOMNode> pChild;

[00855] CComBSTR value;

[00856] hr = pChildNodes->nextNode(&pChild);

[00857] ApHrCheck(hr, COMException(hr, L"ProcessSubElements: no child"));

```
[00858]         hr = pChild->get_text(&value);
[00859]         ApHrCheck(hr, MDDFiltException(L"ProcessSubElements: no child"));
[00860]         AddProperty(columnName,(WCHAR *)value);
[00861]       }
[00862]   }
[00863]   // Process the <properties> key.
[00864]   void MDDFilt::ProcessProperties(const CComPtr <IXMLDOMNode> &pNode)
[00865]   {
[00866]     HRESULT hr = S_OK;
[00867]     CComPtr <IXMLDOMNodeList> pChildNodes;
[00868]     hr = pNode->get_childNodes(&pChildNodes);
[00869]     ApHrCheck(hr, MDDFiltException(L"No children of Properties"));
[00870]     if (!pChildNodes)
[00871]     {
[00872]       return;
[00873]     }
[00874]     long numChildren = 0;
[00875]     hr = pChildNodes->get_length(&numChildren);
[00876]     ApHrCheck(hr, COMException(hr, L"Properties: No length"));
[00877]     for (long i = 0; i < numChildren; i++)
[00878]     {
[00879]       CComPtr <IXMLDOMNode> pChild;
[00880]       CComBSTR value;
[00881]       CComBSTR name;
[00882]       hr = pChildNodes->nextNode(&pChild);
[00883]       ApHrCheck(hr, COMException(hr, L"ProcessProperties: no child"));
[00884]       hr = pChild->get_text(&value);
[00885]       ApHrCheck(hr, MDDFiltException(L"ProcessProperties: no text"));
[00886]       hr = pChild->get_baseName(&name);
[00887]       ApHrCheck(hr, MDDFiltException(L"ProcessProperties: no baseName"));
[00888]       CComPtr <IXMLDOMNamedNodeMap> pAttributes;
[00889]       hr = pChild->get_attributes(&pAttributes);
[00890]       ApHrCheck(hr, MDDFiltException(L"ProcessProperties: no attributes"));
[00891]       if (!pAttributes)
```

| [00892] | { |
| [00893] | continue; |
| [00894] | } |
| [00895] | CComPtr <IXMLDOMNode> pNamedNode; |
| [00896] | hr = pAttributes->getNamedItem(L"name", &pNamedNode); |
| [00897] | ApHrCheck(hr, MDDFiltException(L"ProcessProperties: no name attribute")); |
| [00898] | if (!pNamedNode) |
| [00899] | { |
| [00900] | continue; |
| [00901] | } |
| [00902] | hr = pNamedNode->get_text(&name); |
| [00903] | ApHrCheck(hr, MDDFiltException(L"ProcessProperties: name : get_text failed")); |
| [00904] | AddProperty((WCHAR *)name,(WCHAR *)value); |
| [00905] | } |
| [00906] | } |
| [00907] | // Process the <parents> element. |
| [00908] | void MDDFilt::ProcessParents(const CComPtr <IXMLDOMNode> &pNode) |
| [00909] | { |
| [00910] | HRESULT hr = S_OK; |
| [00911] | CComPtr <IXMLDOMNodeList> pChildNodes; |
| [00912] | hr = pNode->get_childNodes(&pChildNodes); |
| [00913] | ApHrCheck(hr, MDDFiltException(L"No children of Parents")); |
| [00914] | if (!pChildNodes) |
| [00915] | { |
| [00916] | return; |
| [00917] | } |
| [00918] | long numChildren = 0; |
| [00919] | hr = pChildNodes->get_length(&numChildren); |
| [00920] | ApHrCheck(hr, COMException(hr, L"Parents: No length")); |
| [00921] | for (long i = 0; i < numChildren; i++) |
| [00922] | { |
| [00923] | CComPtr <IXMLDOMNode> pChild; |

```
[00924]    CComBSTR value;
[00925]    hr = pChildNodes->nextNode(&pChild);
[00926]    ApHrCheck(hr, COMException(hr, L"ProcessParents: no child"));
[00927]    hr = pChild->get_text(&value);
[00928]    ApHrCheck(hr, MDDFiltException(L"ProcessParents: no text"));
[00929]    CComPtr <IXMLDOMNamedNodeMap> pAttributes;
[00930]    hr = pChild->get_attributes(&pAttributes);
[00931]    ApHrCheck(hr, MDDFiltException(L"ProcessParents: no attributes"));
[00932]        if (!pAttributes)
[00933]        {
[00934]           continue;
[00935]        }
[00936]    CComPtr <IXMLDOMNode> pOrderNode;
[00937]    hr = pAttributes->getNamedItem(L"order", &pOrderNode);
[00938]    ApHrCheck(hr, MDDFiltException(L"ProcessParents: no order attribute"));
[00939]    if (!pOrderNode)
[00940]        {
[00941]           continue;
[00942]        }
[00943]    CComBSTR orderNum;
[00944]    hr = pOrderNode->get_text(&orderNum);
[00945]    ApHrCheck(hr, MDDFiltException(L"ProcessParents: order : get_text failed"));
[00946]    CComPtr <IXMLDOMNode> pPrimaryParentNode;
[00947]    hr = pAttributes->getNamedItem(L"primaryParent", &pPrimaryParentNode);
[00948]    ApHrCheck(hr, MDDFiltException(L"ProcessParents: no primary attribute"));
[00949]
[00950]    if (!pPrimaryParentNode)
[00951]        {
[00952]           continue;
[00953]        }
[00954]    CComBSTR primaryParent;
```

[00955] hr = pPrimaryParentNode->get_text(&primaryParent);

[00956] ApHrCheck(hr, MDDFiltException(L"ProcessParents: primaryParent attr : get_text failed"));

[00957] int primaryParentNum = _wtoi((WCHAR *)primaryParent);

[00958] if (primaryParentNum == 1)

[00959] {

[00960] AddProperty(L"primaryParent", (WCHAR *)value);

[00961] }

[00962] CString orderVal = L"order=";

[00963] orderVal += orderNum;

[00964] orderVal += L"#";

[00965] CString val = orderVal;

[00966] val += value;

[00967] // The value looks like: order=num#AssetKey or order=#AssetKey in case order is missing.

[00968] AddProperty(L"parents",val);

[00969] }

[00970] }

[00971] // Load up IFilter from the path specified in <contentName>

[00972] // If contentType is aml, we load up the aml file instead. (and treat as embedded)

[00973] void MDDFilt::ProcessLinkedFullTextData(const CComPtr <IXMLDOMNode> &pNode)

[00974] {

[00975] HRESULT hr = S_OK;

[00976] CComBSTR contentFile;

[00977] hr = pNode->get_text(&contentFile);

[00978] ApHrCheck(hr, COMException(hr, L"contentName: get_text failed"));

[00979] // Index Content Name.

[00980] AddProperty(L"contentName",(WCHAR *)contentFile);

[00981] WCHAR mddDir[MAX_PATH];

[00982] errno_t err = _wsplitpath_s(m_mddFileName, NULL, 0, mddDir, MAX_PATH, NULL, 0, NULL, 0);

[00983] if (err) // Ignore Text.

[00984] {

[00985]     return;
[00986]     }
[00987]     CString contentFileName = mddDir;
[00988]     contentFileName += contentFile;
[00989]
[00990]     if (m_pLinkedDocumentFilter)
[00991]     {
[00992]         m_pLinkedDocumentFilter = NULL;
[00993]     }
[00994]     // If aml, load it and get the text.
[00995]     if (m_contentType.CompareNoCase(L"aml") == 0)
[00996]     {
[00997]         try
[00998]         {
[00999]             GetTextFromAml(contentFileName);
[001000]        }
[001001]        catch (COMException e)
[001002]        {
[001003]            m_Text = L"";
[001004]        }
[001005]        return;
[001006]    }
[001007]    // Not aml. Pick up the appropriate Filter.
[001008]    hr = LoadIFilter(contentFileName, NULL, (void **)&m_pLinkedDocumentFilter);
[001009]    if (FAILED(hr))
[001010]    {
[001011]        m_pLinkedDocumentFilter = NULL;
[001012]        return;
[001013]    }
[001014] }
[001015] // Populate m_Text using the <ftsdata> element.
[001016] // This takes precedence over any linked document.

[001017] void MDDFilt::ProcessEmbeddedFullTextData(const CComPtr <IXMLDOMNode> &pNode)

[001018] {

[001019] HRESULT hr = S_OK;

[001020] if (m_pLinkedDocumentFilter) // <ftsdata> takes precedence over linked doc.

[001021] {

[001022] m_pLinkedDocumentFilter = NULL;

[001023] }

[001024] hr = pNode->get_text(&m_Text);

[001025] ApHrCheck(hr, MDDFiltException(L"ftsdata: get_text failed"));

[001026] m_numCharsLeft = m_Text.Length();

[001027] }

[001028] // Loads up aml File and get the fts data. Populates m_Text.

[001029] void MDDFilt::GetTextFromAml(const CString &amlFile)

[001030] {

[001031] m_amlProcessor.ExtractBody(amlFile, m_Text);

[001032] m_numCharsLeft = m_Text.Length();

[001033] }

[001034] // sets the culture based on the locale name.

[001035] void MDDFilt::SetLCID(const CString &culture)

[001036] {

[001037] m_locale = 1033;

[001038] HMODULE hNlsdll = LoadLibraryW(L"nlsdl.dll");

[001039] if (hNlsdll != NULL)

[001040] {

[001041] pfnDownLevelLocaleNameToLCID func = (pfnDownLevelLocaleNameToLCID)GetProcAddress(hNlsdll, "DownlevelLocaleNameToLCID");

[001042] if (func != NULL)

[001043] {

[001044] m_locale = func((LPCWSTR)culture, 0);

[001045] FreeLibrary(hNlsdll);

[001046] return;

[001047] }

```
#pragma once
//Include .REG Files.
#include "resource.h"
#include "stdafx.h"
#include <vector>
#include <utility>
#include "mddfiltexceptions.h"
#include "schemaHandler.h"
#include "xmlutil.h"
#include "amlProcessor.h"
#include "property.h"
using namespace std;
// {F7B144F3-F637-4a0a-9CF9-494D3B4C6D99}
static const GUID CLSID__PersistentHandler =
{
    0xf7b144f3,
    0xf637,
    0x4a0a,
    { 0x9c, 0xf9, 0x49, 0x4d, 0x3b, 0x4c, 0x6d, 0x99 }
};
// Prop Guid for Full Text Data.
static const GUID StoragePropSet =
{
    0xb725f130,
    0x47ef,
    0x101a,
    { 0xa5, 0xf1, 0x02, 0x60, 0x8c, 0x9e, 0xeb, 0xac }
};
// false is to not include default idls.
// Refer msdn documentation.
[emitidl(true, false)];
// MDDFilt
[
    coclass,
    threading(both),
    vi_progid("MddFilter"),
    progid("MddFilter.1"),
    version(1.0),
    uuid("ACA0BF5C-A5A9-11DA-8A7A-0008744F4E8A"),
    helpstring("AP MDDFilter Class")
]
class ATL_NO_VTABLE MDDFilt :
    public IFilter,
    public IPersistFile,
    public IPersistStream
{
public:
    MDDFilt( );
    ~MDDFilt( );
    // IFilter Methods
    STDMETHOD(Init)(
        ULONG grfFlags,
        ULONG cAttributes,
        FULLPROPSPEC const * aAttributes,
        ULONG * pFlags
    );
    STDMETHOD(GetChunk)(STAT_CHUNK * pStat);
    STDMETHOD(GetText)(ULONG * pcwcBuffer, WCHAR * awcBuffer);
    STDMETHOD(GetValue)(PROPVARIANT **ppPropValue);
    STDMETHOD(BindRegion)(FILTERREGION origPos, const IID &riid, void ** ppunk);
    // IPersistFile Methods.
    STDMETHOD(GetClassID)(CLSID * pClassID);
    STDMETHOD(Load)(LPCWSTR pszFileName, DWORD dwMode);
    STDMETHOD(Save)(LPCWSTR pszFileName, BOOL fRemember);
    STDMETHOD(SaveCompleted)(LPCWSTR pszFileName);
    STDMETHOD(GetCurFile)(LPWSTR *ppszFileName);
    STDMETHOD(IsDirty)( );
    // IPersistStream Methods.
    STDMETHOD(Load)(IStream *pStm);
    STDMETHOD(Save)(IStream *pStm, BOOL fClearDirty);
    STDMETHOD(GetSizeMax)(ULARGE_INTEGER *pcbSize);
private:
    // Private Methods.
    void ParseFile(const CString &fileName); //Parses MDD given Filename.
    void ParseStream(IStream *pStm); // Parses MDD given stream.
    void ParseMddDom(const CComPtr <IXMLDOMDocument2> &pMddDom); // Parses loaded MDD DOM.
    void ProcessAssetKey(const CComPtr <IXMLDOMNode> &pNode); // Parse
```

-continued

```
Asset Key.
        void ProcessProperties(const CComPtr <IXMLDOMNode> &pNode); // Parse
<properties>
        void ProcessParents(const CComPtr <IXMLDOMNode> &pNode); // Parse
<parents>
        void ProcessSubElements(const CComPtr <IXMLDOMNode> &pNode, const
CString &columnName);
        void ProcessLinkedFullTextData(const CComPtr        <IXMLDOMNode>
&pNode); // <contentName>
        void ProcessEmbeddedFullTextData(const CComPtr        <IXMLDOMNode>
&pNode); // <ftsdata>
        void ProcessNode(const CComPtr <IXMLDOMNode> &pNode);
        void AddProperty(const CString &column, const CString &val); // sets up
m_properties ifilter methods
        typedef LCID (*pfnDownLevelLocaleNameToLCID)(LPCWSTR, DWORD);
        #define LCID_REGISTRYKEY
L"Software\\Microsoft\\AssistancePlatform\\2.0\\Client\\LCID"
        void SetLCID(const CString &culture); // m_locale = ?
        void GetTextFromAml(const CString &amlFile); // get fts data from aml file.
        HRESULT GetPropertyChunk(STAT_CHUNK *pStat); // Internal GetChunk
helpers.
        HRESULT GetTextChunk(STAT_CHUNK *pStat);
        / Helper Classes.
        // Comparator for map.
        class GuidPropIdComparator : public std::binary_function <
                pair <GUID,PROPID>, pair <GUID, PROPID>,
                bool>
        {
        public:
          bool operator( ) (pair <GUID,PROPID> l, pair <GUID, PROPID> r) const
          {
            if (l.second != r.second) //Compare PropID first.
            {
              return l.second < r.second;
            }
            else //Compare GUID now.
            {
              GUID left = l.first;
              GUID right = r.first;
return (memcmp(&left,&right,sizeof(GUID)) < 0);
            }
          }
        };
        typedef map <pair <GUID, PROPID>, Property,
GuidPropIdComparator>::iterator propertyIter;
        enum ChunkType {ChunkNone, ChunkValue, ChunkText};
        // Private Members.
        // The main map, which contains all the <name, value> pairs for the given
asset.
        map <pair <GUID, PROPID>, Property, GuidPropIdComparator>
m_properties;
        bool m_loadFailed; // Were we able to load the MDD file?
        bool m_initFailed; // Did IFilter::Init fail?
        bool m_assetKeyFound; // Did we find an assetKey element?
        LCID m_locale; // content language. Got from assetKey.
        bool m_textOnly; // Index component wants return only Text.
        CComBSTR m_Text; // The actual text
        ULONG m_numCharsLeft; // number of characters remaining to be filtered.
(GetTexTed)
        ULONG m_chunkId; // Current Chunk ID: 1 implies no chunks returned yet.
        ChunkType m_lastEmittedChunkType; // Prop or Text of the Chunk just
GetChunked.
        propertyIter m_currentChunkIter; // The pointer to prop being GetChunked and
GetValued.
        bool m_pendingPropertyChunk; // If a GetChunk has been called, but no
GetValue yet.
        CString m_mddFileName; // Path to mdd file.
        CString m_contentType; // Type of Content, AML, TOC, etc.
        CSmartPtr   <SchemaHandler>   m_pSchemaHandler;    // Schema Handler.
Handles the (column,value) mapping.
        CComPtr   <IFilter>   m_pLinkedDocumentFilter;   //   If <contentName>,
corresponding filter.
        amlProcessor m_amlProcessor; // Processor From linked aml.
        };
```

The metadata handler can include an mddfilterexceptions.h module which provides an auxiliary support file describing all the "exceptions" thrown from the metadata handler, such as from a metadata IFilter for example. The mddfilterexceptions.h module includes:

```
/*
* MDDFiltExceptions.h : Internal Exceptions of MDD Filter.
*/
#pragma once
#include "exceptions.h"
namespace APClient
{
    class MDDFiltException : public ApException
    {
    public:
        MDDFiltException(const CComBSTR& message = L"") : ApException(message) { }
        virtual ~MDDFiltException( ) { }
        DECLARE_APEXCEPTION( );
    };
    class MDDFiltFileNotLoadedException : public ApException
    {
    public:
        MDDFiltFileNotLoadedException(const CComBSTR& message = L"") : ApException(message) { }
        virtual ~MDDFiltFileNotLoadedException( ) { }
        DECLARE_APEXCEPTION( );
    };
    class MDDFiltOutOfMemoryException : public ApException
    {
    public:
        MDDFiltOutOfMemoryException(const CComBSTR& message = L"") : ApException(message) { }
        virtual ~MDDFiltOutOfMemoryException( ) { }
        DECLARE_APEXCEPTION( );
    };
    class MDDFiltAssetKeyNotFoundException : public ApException
    {
    public:
        MDDFiltAssetKeyNotFoundException(const CComBSTR& message = L"") : ApException(message) { }
        virtual ~MDDFiltAssetKeyNotFoundException( ) { }
        DECLARE_APEXCEPTION( );
    };
}
```

The metadata handler can include a property.h module which represents a class used by the metadata handler to represent a "property". The property can be used to describe metadata (name, type, value, etc.). The property.h module includes:

```
#pragma once
#include "stdafx.h"
#include "strsafe.h"
#include "propidl.h"
// Representation (FULLPROPSPEC and corresponding PROPVARIANT). Used for GetChunk and GetValue.
class Property
{
public:
    Property( ) { };
    Property(GUID guid, PROPID pId, VARTYPE type):
    m_guid(guid),m_propId(pId), m_type(type)
    {
    }
    ~Property( ) { };
    // Add value to array. Useful in case of multi-valued columns.
    void AppendValue(const CString &val)
    {
```

-continued

```
            m_values.push_back(val);
        }
        PROPVARIANT *GetPropVariant( )
        {
            // handling VT_LPWSTR and VT_VECTOR|VT_LPWSTR
            PROPVARIANT        *pPV       =       (PROPVARIANT
*)CoTaskMemAlloc(sizeof(PROPVARIANT));
            if (!pPV)
            {
                ApThrow(MDDFiltOutOfMemoryException(L"Cannot       create
propVariant"));
            }
            PropVariantInit(pPV);
            pPV->vt = m_type;
            size_t numString = m_values.size( );
            if (numString == 0) // Should not be hit.
            {
                CoTaskMemFree(pPV);
                pPV = NULL;
                return pPV;
            }
            size_t i = 0;
            LPWSTR * ppVal = NULL;
            HRESULT hr = S_OK;
            switch (m_type & (~VT_LPWSTR))
            {
                case VT_VECTOR:
                    ppVal = (WCHAR **)CoTaskMemAlloc(numString*sizeof(WCHAR
*));
                    if (!ppVal)
                    {
                        CoTaskMemFree(pPV);
                        pPV = NULL;
                        ApThrow(MDDFiltOutOfMemoryException(L"Cannot       create
propString"));
                    }
                    for (i = 0; i < numString ; i ++)
                    {
                        size_t len = m_values[i].GetLength( )+1;
                        WCHAR           *pVal          =
(LPWSTR)CoTaskMemAlloc(len*sizeof(WCHAR));
                        if (!pVal)
                        {
                            break;
                        }
                        hr = StringCchCopyW(pVal, len, m_values[i]);
                        if (FAILED(hr))
                        {
                            CoTaskMemFree(pVal);
                            break;
                        }
                        ppVal[i] = pVal;
                    }
                    if (i < numString) // Memory allocation failed.
                    {
                        for (size_t j = 0; j < i; j++)
                        {
                            CoTaskMemFree(ppVal[j]);
                        }
                        CoTaskMemFree(ppVal);
                        CoTaskMemFree(pPV);
                        pPV = NULL;
                        ApThrow(MDDFiltOutOfMemoryException(L"Cannot       create
propString"));
                    }
                    pPV->calpwstr.cElems = numString;
                    pPV->calpwstr.pElems = ppVal;
                    break;
                default:
                    size_t len = m_values[0].GetLength( )+1;
                    WCHAR                       *pVal            =
(LPWSTR)CoTaskMemAlloc(len*sizeof(WCHAR));
                    if (!pVal)
                    {
                        CoTaskMemFree(pPV);
                        pPV = NULL;
                        ApThrow(MDDFiltOutOfMemoryException(L"Cannot       create
propString"));
                    }
```

-continued

```
            hr = StringCchCopyW(pVal, len, m_values[0]);
            if (FAILED(hr))
            {
                CoTaskMemFree(pVal);
                CoTaskMemFree(pPV);
                pPV = NULL;
                ApThrow(MDDFiltOutOfMemoryException(L"String        Copy
Failed"));
            }
            pPV->pwszVal = pVal;
        }
        return pPV;
    }
    FULLPROPSPEC GetFullPropSpec( )
    {
        FULLPROPSPEC propSpec;
        propSpec.guidPropSet = m_guid;
        propSpec.psProperty.ulKind = PRSPEC_PROPID;
        propSpec.psProperty.propid = m_propId;
        return propSpec;
    }
private:
    GUID m_guid;
    PROPID m_propId;
    VARTYPE m_type;
    vector <CString> m_values;
};
```

The metadata handler can include a resource.h module which corresponds with an auto-generated resource file and includes:

```
//{ {NO_DEPENDENCIES} }
// Used by mddfilt.rc
#pragma once
#define IDS_PROJNAME         100
#define IDR_MDDFILT 101
// Next default values for new objects
//
#ifdef APSTUDIO_INVOKED
#ifndef APSTUDIO_READONLY_SYMBOLS
#define _APS_NEXT_RESOURCE_VALUE    201
#define _APS_NEXT_COMMAND_VALUE     32768
#define _APS_NEXT_CONTROL_VALUE     201
```

-continued

```
#define _APS_NEXT_SYMED_VALUE       102
#endif
#endif
```

The metadata handler can include a Stdafx.cpp module which corresponds with an auto-generated file used for pre-compiling standard headers and includes:

```
// stdafx.cpp : source file
// APMetaDataFilter.pch the pre-compiled header
// stdafx.obj will contain the pre-compiled type information
#include "stdafx.h"
```

The metadata handler can include a stdafx.h module which corresponds with an auto-generated standard header file used to declare all headers that would be precompiled.

```
/* stdafx.h : include file for standard system include files, or project specific
include files that are used frequently, but are changed infrequently */
    #pragma once
    #ifndef STRICT
    #define STRICT
    #endif
    // Modify the following referring to target a platform prior to the ones specified
below.
    #ifndef WINVER
    #define WINVER 0x0501         // Change this to the appropriate value to
target other operating system versions.
    #endif
    #ifndef _WIN32_WINNT
    #define _WIN32_WINNT 0x0501   // Change this to the appropriate value to
target other operating system versions.
    #endif
    #ifndef _WIN32_WINDOWS
    #define _WIN32_WINDOWS 0x0410
    #endif
    #ifndef _WIN32_IE
```

-continued

```
        #define _WIN32_IE 0x0600
        #endif
        #define _ATL_APARTMENT_THREADED
        #define _ATL_NO_AUTOMATIC_NAMESPACE
        #define _ATL_CSTRING_EXPLICIT_CONSTRUCTORS      //   some   CString
constructors are explicit
        #include <atlbase.h>
        #include <atlcom.h>
        #include <atlsimpcoll.h>
        #include <atlwin.h>
        #include <atltypes.h>
        #include <atlctl.h>
        #include <atlhost.h>
        #include <filter.h>
        #include <filterr.h>
        #include <atlcoll.h>
        #include <comutil.h>
        #include <comdef.h>
        #include <atlstr.h>
        #include <map>
        #include <set>
        using namespace ATL;
        //Removing atlsafe.h, to resolve any linker errors
        // For use in top-level COM interface method implementations
        #define MDDFILT_COM_BEGIN(x)                  \
           HRESULT x = S_OK;                          \
           try                                        \
           {                                          \
        #define MDDFILT_COM_END(x)                    \
           }                                          \
           catch(CAtlException& e)    { x = HRESULT(e);}     \
           catch(std::bad_alloc&)     { x = E_OUTOFMEMORY;}  \
           catch(std::exception&)     { x = E_UNEXPECTED;}   \
           return x;
```

Various embodiments described herein can be included with the functionality of an assistance platform rich client. Users can execute searches using the assistance platform rich client which can operate to issue a search for MDD files to a desktop search engine. The MDD files can be interacted with, due in part to the XML file format, to ascertain an actual location and name of a particular file that is represented in part by metadata. The desktop search can operate to return the content, link, or other user-friendly information to the user based on an introspection of the MDD file.

The embodiments and examples described herein are not intended to be limiting and other embodiments are available. For example, the functionality described herein can be used as part of an xcopy based installation through self-describing content. Content can be installed that have relationships to other installed content, by describing the relationships through metadata. This enables simple xcopy-based installation without the need to modify registry or create custom files that encapsulate the relationships.

As another example, the functionality described herein can be used to provide a uniform representation of metadata across different media formats (wma, mp3, jpeg, png, etc.). Metadata files can be used to provide a uniform representation for all metadata for various media formats. Since the format is flexible and extensible, any metadata can be captured in the MDD file. For example, the uniform representation can be used when a media player needs to process metadata from a WMA file, an mp3 file, a wav file or other formats. Instead of learning the format for each file-type (current and future formats), a reliance can be placed on the MDD file for a uniform representation of any associated metadata.

As further example, the functionality described herein can be used to provide an instant shortcut mechanism to create "shortcuts" or "hot words". A shortcut is a word or phrase, which, when typed or otherwise communicated, launches an application or performs some other task. For instance, typing "notepad" in a search box can operate to launch a notepad application. Since the metadata handler functionality is not restricted to file-based content, a "shortcut" can be represented using an MDD file. In such a case, the title would be the name of the shortcut, the "content type" in the MDD file would be "shortcut", and the associated content name would be the path to the application to be launched along with any parameters. A user is able define a shortcut for any application by creating such an MDD file. The shortcut can then be indexed as described above using a metadata handler. When a user types "notepad" in the "start search" box, the operating system (OS) can perform a lookup to determine if there is anything indexed with title "notepad" and content type "shortcut". If it finds one, the OS can launch the associated application pointed to by content name.

The functionality described herein can be applied to associate different sets of metadata for the same content targeting different applications. The functionality can also be applied to newly created or foreign file formats. The functionality allows users to provide tailored metadata for various files as part of a uniform metadata representation. Moreover, the functionality can be used to associate metadata with non-file-based content, such as a virtual content, etc., and allows for searching over file-based, virtual, and other content simultaneously and seamlessly. That is, as described above, an abstraction layer for metadata is provided for access that can be configured to be independent of content-type. The functionality described herein can be used to operate with binary formats, such as image files, etc. For example, a user may be writing a blog or some kind of a description about a particular innovation picture captured as an image file. Accordingly, an MDD file can be used to associate the blog and image file.

The systems and components described above can be implemented as part of networked, distributed, or other computer-implemented environment. The systems and components can communicate via a wired, wireless, and/or a combination of communication networks. In an alternative embodiment, the handler 104 can be included with the index component 102 as a single component for providing functionality for indexing and searching for information associated with a number of files or other data representations. In another embodiment, the handler 104 can be included as part of the functionality of an OS. A system can also include a number of handler components, wherein each handler component can include particular functionality associated with one or more file types.

A number of client computing devices, including desktop computers, laptops, handhelds, or other smart devices can interact with and/or be included as part of the system 100. In alternative embodiments, the various components can be combined and/or configured according to a desired implementation. Other embodiments and configurations are available.

Exemplary Operating Environment

Figure 5:
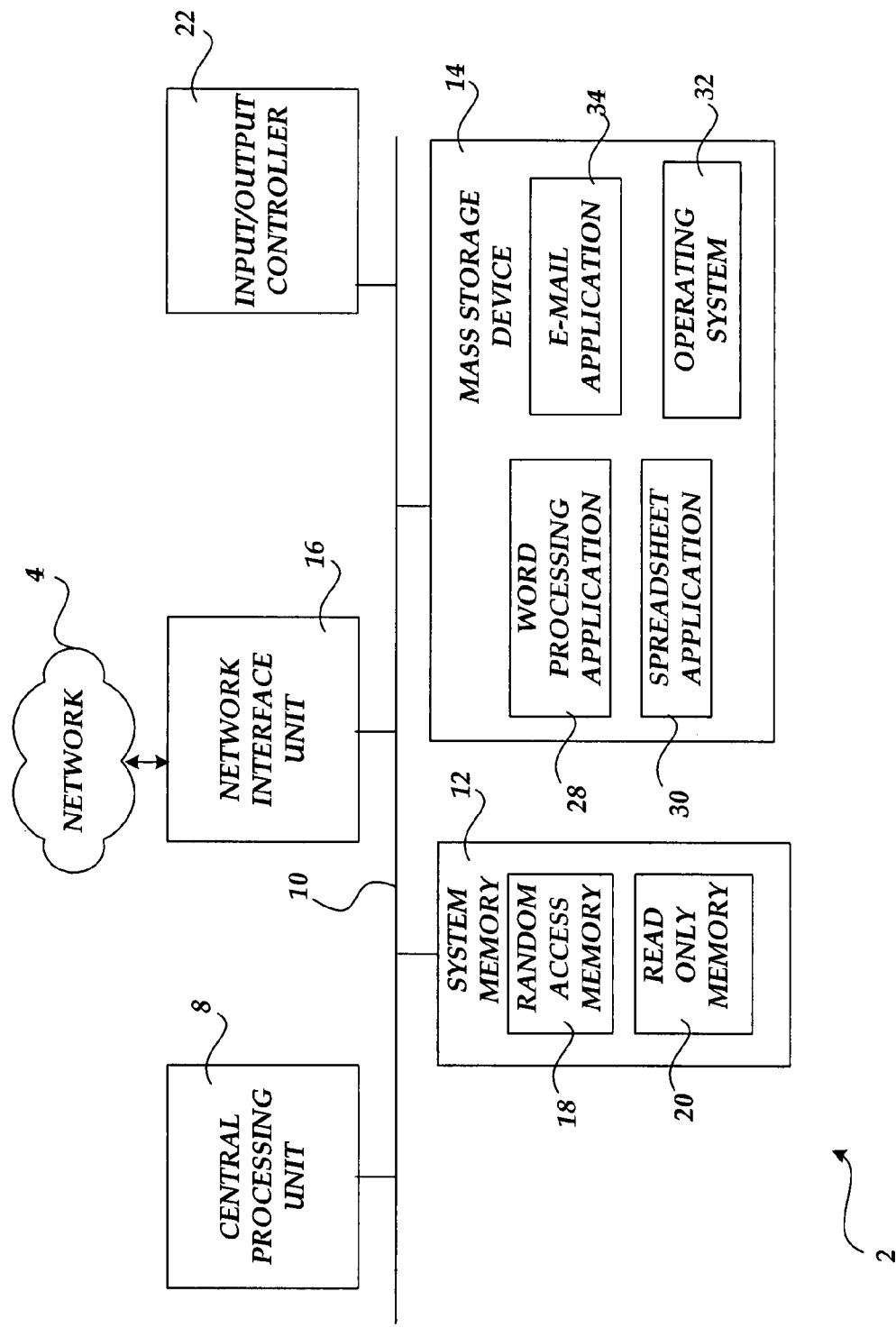
FIG. 5 is a block diagram illustrating a computing environment for implementation of various embodiments described herein.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer readable medium including executable instructions which, when executed by a processor, manage a method comprising:

extracting first metadata from a plurality of underlying information sources;

creating a plurality of information sources that include uniform representations of metadata by using extracted first metadata of the plurality of underlying information sources, additional metadata, and a content-type independent schema in part to create different metadata sets for certain ones of the plurality of underlying information sources including non-file based sources based in part on a use context and launch of an associated application;

monitoring a storage medium that includes the plurality of information sources, wherein each information source includes a uniform metadata representation;

extracting second metadata from the plurality of information sources; and, indexing the second metadata of the plurality of information sources as part of an indexing operation using heterogeneous indexing features.

2. The computer-readable medium of claim 1, wherein the instructions, when executed, manage information by extracting the second metadata from a data structure that includes a name-value pair, including multi-values, associated with the first metadata of the underlying information source, and further wherein the content-type independent schema defines collections for filtering and scoping, keywords, queries, properties, and full text search data for the plurality of information sources.

3. The computer-readable medium of claim 2, wherein the instructions, when executed, manage information by extracting the second metadata from a secondary data stream associated with a content-based file.

4. The computer-readable medium of claim 2, wherein the instructions, when executed, manage information by extracting full-text search (FTS) data from the data structure, and the additional metadata includes annotations and notes.

5. The computer-readable medium of claim 1, wherein the instructions, when executed, manage information by searching the indexed metadata, wherein each information source can provide a direct or indirect link to an associated underlying information source.

6. The computer-readable medium of claim 1, wherein the instructions, when executed, manage information by extracting the second metadata from the plurality of information sources that includes metadata associated with different underlying data representations, formats, and types.

7. The computer-readable medium of claim 1 wherein the instructions, when executed, manage information by extracting the second metadata from the plurality of information sources associated with the plurality of underlying information sources that include a number of virtual sources, a number of binary sources, a number of user-defined sources, and a number of new sources.

8. The computer-readable medium of claim 1, wherein the instructions, when executed, manage information by mapping extracted second metadata from a first metadata schema to a second metadata schema.

9. The computer-readable medium of claim 8, wherein the instructions, when executed, manage information by mapping the extracted second metadata from a generic metadata schema to an application-specific metadata schema.

10. The computer-readable medium of claim 1, wherein the instructions, when executed, manage information by using extracted second metadata to index information associated with a number of disparate file types.

11. The computer-readable medium of claim 1, wherein the instructions, when executed, manage information by using extracted second metadata as part of an indexing operation associated with a number of intrinsic or extrinsic properties.

12. The computer-readable medium of claim 1, wherein the instructions, when executed, manage information by extracting the second metadata from a number of metadata definition document (MDD) files, wherein each MDD file includes metadata associated with one of a group of underlying information sources including an audio file, a document file, a spreadsheet file, a video file, an image file, a textual file, binary file, and a virtual source.

* * * * *